(12) United States Patent
Balinsky et al.

(10) Patent No.: US 7,712,675 B2
(45) Date of Patent: May 11, 2010

(54) PHYSICAL ITEMS FOR HOLDING DATA SECURELY, AND METHODS AND APPARATUS FOR PUBLISHING AND READING THEM

(75) Inventors: Helen Balinsky, Bristol (GB); Weng Wah Loh, Bristol (GB); Fraser John Dickin, Bristol (GB); Thomas Rathbone, Bristol (GB); Stefek Malkowski Zaba, Bristol (GB); Keith Alexander Harrison, Bristol (GB); John Waters, Bristol (GB); James Thomas Edward McDonnell, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 865 days.

(21) Appl. No.: 11/493,031

(22) Filed: Jul. 26, 2006

(65) Prior Publication Data
US 2007/0095928 A1  May 3, 2007

Related U.S. Application Data

(63) Continuation-in-part of application No. 10/697,272, filed on Oct. 31, 2003, now Pat. No. 7,309,017.

(30) Foreign Application Priority Data
Jan. 15, 2003  (GB)  ................ 0300906.5

(51) Int. Cl.
*G06K 19/06* (2006.01)
*G06K 19/00* (2006.01)
*G06Q 40/00* (2006.01)
*G07D 11/00* (2006.01)
*G07F 19/00* (2006.01)
*H04L 9/32* (2006.01)
*G06F 21/00* (2006.01)
*G05B 19/00* (2006.01)

(52) U.S. Cl. .................. 235/492; 235/487; 235/379; 713/176; 713/185; 713/186; 340/5.52; 340/5.82

(58) Field of Classification Search .......... 713/176, 713/179, 185, 186; 235/487, 492, 493, 435, 235/379; 340/5.52, 5.82
See application file for complete search history.

(56) References Cited

U.S. PATENT DOCUMENTS

| 5,055,913 | A |   | 10/1991 | Haghiri-Tehrani |
| 5,090,736 | A |   | 2/1992  | Minkus |
| 5,469,506 | A | * | 11/1995 | Berson et al. ............ 713/186 |
| 5,590,038 | A | * | 12/1996 | Pitroda .................... 705/41 |
| 5,762,378 | A |   | 6/1998  | Phillips |
| 5,898,370 | A |   | 4/1999  | Reymond |

(Continued)

FOREIGN PATENT DOCUMENTS

EP  1 139 302  10/2001

(Continued)

*Primary Examiner*—Daniel Walsh

(57) ABSTRACT

A physical object comprises one or more memory circuits adapted to be read wirelessly by a reader device attached to or incorporated within the physical object. Data in the memory circuit is protected from access by an unauthorised reader. Data in the memory circuit is also adapted to identify an authorised bearer of the physical object. Moreover, data in the memory circuit is adapted to allow access to a specified asset or assets by the authorised bearer.

12 Claims, 16 Drawing Sheets

U.S. PATENT DOCUMENTS

| | | | |
|---|---|---|---|
| 5,991,412 A * | 11/1999 | Wissenburgh et al. | 705/67 |
| 6,024,287 A * | 2/2000 | Takai et al. | 235/493 |
| 6,100,804 A * | 8/2000 | Brady et al. | 340/572.7 |
| 6,208,746 B1 * | 3/2001 | Musgrave | 382/100 |
| 6,257,486 B1 | 7/2001 | Teicher et al. | |
| 6,317,834 B1 * | 11/2001 | Gennaro et al. | 713/186 |
| 6,480,869 B1 | 11/2002 | Fujioka | |
| 6,490,680 B1 * | 12/2002 | Scheidt et al. | 713/166 |
| 6,672,512 B2 | 1/2004 | Bridgelall | |
| 6,704,608 B1 * | 3/2004 | Azuma | 700/66 |
| 6,776,332 B2 | 8/2004 | Allen et al. | |
| 6,794,000 B2 | 9/2004 | Adams et al. | |
| 6,804,378 B2 * | 10/2004 | Rhoads | 382/100 |
| 6,823,459 B1 * | 11/2004 | Horikoshi et al. | 726/17 |
| 6,827,279 B2 | 12/2004 | Teraura | |
| 6,967,577 B2 * | 11/2005 | Taylor et al. | 340/572.1 |
| 6,990,587 B2 * | 1/2006 | Willins et al. | 713/182 |
| 6,994,262 B1 * | 2/2006 | Warther | 235/492 |
| 7,066,382 B2 * | 6/2006 | Kaplan | 235/375 |
| 7,076,083 B2 * | 7/2006 | Blazey | 382/100 |
| 7,083,090 B2 * | 8/2006 | Zuili | 235/383 |
| 7,170,391 B2 * | 1/2007 | Lane et al. | 340/5.82 |
| 7,221,258 B2 * | 5/2007 | Lane et al. | 340/10.1 |
| 7,333,001 B2 * | 2/2008 | Lane et al. | 340/10.1 |
| 7,385,509 B2 * | 6/2008 | Taylor et al. | 340/572.1 |
| 7,616,777 B2 * | 11/2009 | Rodriguez et al. | 382/100 |
| 2001/0025342 A1 * | 9/2001 | Uchida | 713/186 |
| 2001/0034836 A1 * | 10/2001 | Matsumoto et al. | 713/176 |
| 2002/0010684 A1 * | 1/2002 | Moskowitz | 705/75 |
| 2002/0024419 A1 * | 2/2002 | Dunn | 340/5.52 |
| 2002/0057440 A1 | 5/2002 | Weiner et al. | |
| 2002/0087867 A1 | 7/2002 | Oberle et al. | |
| 2002/0094639 A1 * | 7/2002 | Reddy | 438/257 |
| 2002/0100803 A1 | 8/2002 | Sehr | |
| 2002/0135481 A1 | 9/2002 | Conwell et al. | |
| 2002/0138291 A1 * | 9/2002 | Vaidyanathan et al. | 705/1 |
| 2002/0147918 A1 * | 10/2002 | Osthoff et al. | 713/193 |
| 2002/0170973 A1 | 11/2002 | Teraura | |
| 2003/0005310 A1 * | 1/2003 | Shinzaki | 713/186 |
| 2003/0005311 A1 * | 1/2003 | Kajimura et al. | 713/186 |
| 2003/0031819 A1 | 2/2003 | Adams et al. | |
| 2003/0040913 A1 * | 2/2003 | Praca | 704/273 |
| 2003/0050900 A1 * | 3/2003 | Kuraishi | 705/65 |
| 2003/0089764 A1 * | 5/2003 | Meadow et al. | 235/375 |
| 2003/0136851 A1 * | 7/2003 | Habara et al. | 235/492 |
| 2003/0154355 A1 | 8/2003 | Fernandez | |
| 2003/0161475 A1 * | 8/2003 | Crumly et al. | 380/280 |
| 2003/0172280 A1 * | 9/2003 | Scheidt et al. | 713/182 |
| 2003/0179903 A1 * | 9/2003 | Rhoads | 382/100 |
| 2003/0214388 A1 * | 11/2003 | Stuart et al. | 340/10.1 |
| 2003/0229779 A1 * | 12/2003 | Morais et al. | 713/153 |
| 2003/0229789 A1 * | 12/2003 | Morais et al. | 713/171 |
| 2004/0012496 A1 * | 1/2004 | De Souza et al. | 340/572.3 |
| 2004/0025046 A1 * | 2/2004 | Blume | 713/200 |
| 2004/0041707 A1 * | 3/2004 | Hull et al. | 340/568.1 |
| 2004/0049451 A1 * | 3/2004 | Berardi et al. | 705/39 |
| 2004/0050931 A1 * | 3/2004 | Ono et al. | 235/380 |
| 2004/0066296 A1 | 4/2004 | Atherton | |
| 2004/0069846 A1 * | 4/2004 | Lambert | 235/382 |
| 2004/0100363 A1 | 5/2004 | Lane et al. | |
| 2004/0118658 A1 * | 6/2004 | Schott et al. | 194/210 |
| 2004/0118930 A1 | 6/2004 | Berardi et al. | |
| 2004/0123115 A1 * | 6/2004 | Schuba et al. | 713/186 |
| 2004/0128520 A1 * | 7/2004 | LaCous | 713/186 |
| 2004/0134994 A1 * | 7/2004 | Zaba et al. | 235/492 |
| 2004/0139329 A1 * | 7/2004 | Abdallah et al. | 713/182 |
| 2004/0158724 A1 * | 8/2004 | Carr et al. | 713/186 |
| 2004/0173686 A1 | 9/2004 | Al Amri | |
| 2004/0192438 A1 * | 9/2004 | Wells et al. | 463/29 |
| 2004/0210821 A1 | 10/2004 | Kasser | |
| 2004/0233040 A1 * | 11/2004 | Lane et al. | 340/5.86 |
| 2004/0243806 A1 * | 12/2004 | McKinley et al. | 713/176 |
| 2005/0007236 A1 * | 1/2005 | Lane et al. | 340/5.86 |
| 2005/0035860 A1 * | 2/2005 | Taylor et al. | 340/572.1 |
| 2005/0038741 A1 * | 2/2005 | Bonalle et al. | 705/40 |
| 2005/0144464 A1 * | 6/2005 | Chiu et al. | 713/186 |
| 2005/0156035 A1 * | 7/2005 | Gyi et al. | 235/385 |
| 2005/0244037 A1 * | 11/2005 | Chiu et al. | 382/124 |
| 2006/0077034 A1 * | 4/2006 | Hillier | 340/5.61 |
| 2006/0157559 A1 * | 7/2006 | Levy et al. | 235/380 |
| 2006/0174134 A1 * | 8/2006 | Taylor | 713/186 |
| 2006/0175420 A1 * | 8/2006 | Satou | 235/492 |
| 2006/0199196 A1 * | 9/2006 | O'Banion et al. | 435/6 |
| 2006/0200683 A1 * | 9/2006 | King | 713/193 |
| 2006/0208903 A1 * | 9/2006 | Loh et al. | 340/572.8 |
| 2007/0014443 A1 * | 1/2007 | Russo | 382/124 |
| 2007/0036599 A1 * | 2/2007 | Piersol et al. | 400/76 |
| 2007/0095928 A1 * | 5/2007 | Balinsky et al. | 235/492 |
| 2007/0102920 A1 * | 5/2007 | Bi et al. | 283/72 |
| 2007/0204162 A1 * | 8/2007 | Rodriguez | 713/176 |
| 2007/0250718 A1 * | 10/2007 | Lee et al. | 713/186 |
| 2007/0299783 A1 * | 12/2007 | Beenau et al. | 705/72 |
| 2008/0094220 A1 * | 4/2008 | Foley et al. | 340/572.4 |
| 2008/0162943 A1 * | 7/2008 | Ali et al. | 713/185 |
| 2009/0201128 A1 * | 8/2009 | Campisi | 340/5.53 |

FOREIGN PATENT DOCUMENTS

| | | |
|---|---|---|
| EP | 1 148 440 | 10/2001 |
| EP | 1 179 810 | 2/2002 |
| EP | 1 179 811 | 2/2002 |

* cited by examiner

US 7,712,675 B2

PHYSICAL ITEMS FOR HOLDING DATA SECURELY, AND METHODS AND APPARATUS FOR PUBLISHING AND READING THEM

CROSS-REFERENCE TO RELATED APPLICATIONS

This application is a continuation-in-part of copending U.S. patent application Ser. No. 10/697,272 entitled "Secure Physical Documents, And Methods And Apparatus For Publishing And Reading Them", filed on 31 Oct. 2003. The subject matter of the present assignee's copending U.S. patent application Ser. No. 11/359,458 entitled "Memory Tags With Write Only Memory And Reader Devices And Methods Of Use Therefor", filed on 23 Feb. 2006, and Ser. No. 11/294,479 entitled "Central Processor For Memory Tag", filed on 6 Dec. 2005 are incorporated by reference herein.

FIELD OF THE INVENTION

The invention relates to secure physical items (such as documents), to methods by which they can be created, and to methods by which they can be read. Aspects of the invention are particularly suitable for use in physical credentials (such as passbooks), either to identify an authorised bearer (such as passports) or to allow access by an authorised bearer to an asset (such as bank books).

BACKGROUND OF THE INVENTION

It is well known for smart cards (both conventional smart cards with contacts, and inductively powered contactless smart cards) to contain information identifying a bearer and to allow access to a user asset. Security passes are a further example of a technology in which inductively powered devices are used to identify a bearer—for conventional security pass technology, the presence of a valid security pass is sufficient to operate the security mechanism.

For a number of applications, existing technologies such are these are unsatisfactory. They may be relatively insecure—in the case of a conventional security pass, simply obtaining the security pass may be enough to enable access for an unauthorised person. Many techniques for physical attack upon smart cards are known, and smart cards are also an unsatisfactory form factor for many applications—such as a passport, or a bank passbook. In such cases a known approach is to provide a physical book and a separate smart card—however, it would clearly be desirable to provide instead a single physical item that provides satisfactory security and ease of use, while preserving the possibility of providing various significant information digitally, as is possible with a smart card.

SUMMARY OF THE INVENTION

In a first aspect, the invention provides a physical object, comprising one or more memory circuits adapted to be read wirelessly by a reader device attached to or incorporated within the physical object, wherein data in the memory circuit is protected from access by an unauthorised reader, wherein data in the memory circuit is adapted to identify an authorised bearer of the physical object, and wherein data in the memory circuit is adapted to allow access to a specified asset or assets by the authorised bearer.

DESCRIPTION OF THE DRAWINGS

Specific embodiments of the invention will now be described, by way of example, with reference to the accompanying drawings, of which.

DESCRIPTION OF SPECIFIC EMBODIMENTS

The combination of elements used in embodiments of the present invention allows for security models that do not currently exist. As the memory spot is accessed wireless (and is preferably also wirelessly powered, most conveniently) inductively powered, it can be embedded in the document, allowing forms of tamperproofing that involve physical isolation from potential attacks. Data can be held which personalises the document to a user in a way that is not readily obvious (for example, an image of the user held electronically in a document which itself contains no visible image of the user). In certain embodiments, the memory spot can be provided with processing power to enable a security exchange to be conducted with a reader so as to prevent unauthorised readers from gaining access to the retained information in any useful form. Specific elements used by embodiments of the invention will be described before full embodiments of the invention are themselves described.

Figure 7:
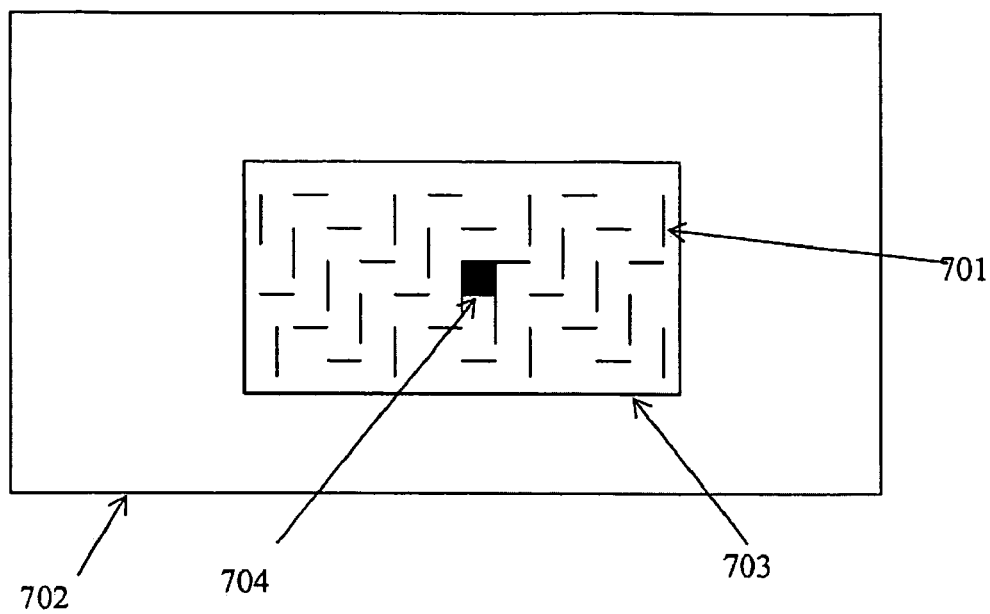
FIG. 7 describes a tamper-evident security feature for a security document with respect to physical tampering.
Figure 8:
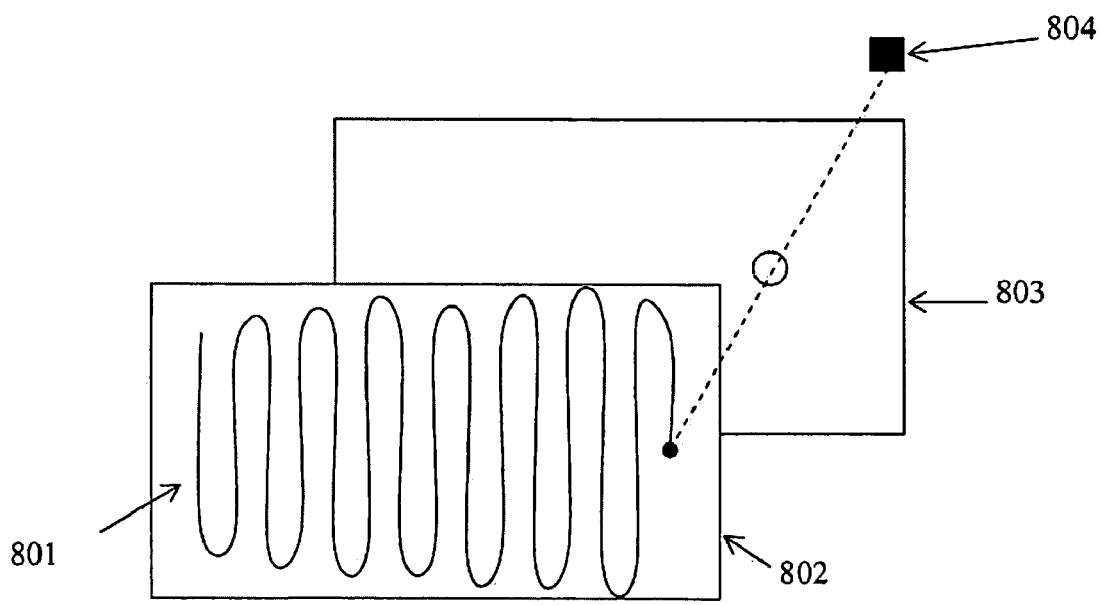
FIG. 8 describes a tamper-resistant security feature for a security document with respect to physical tampering.
Figure 9:
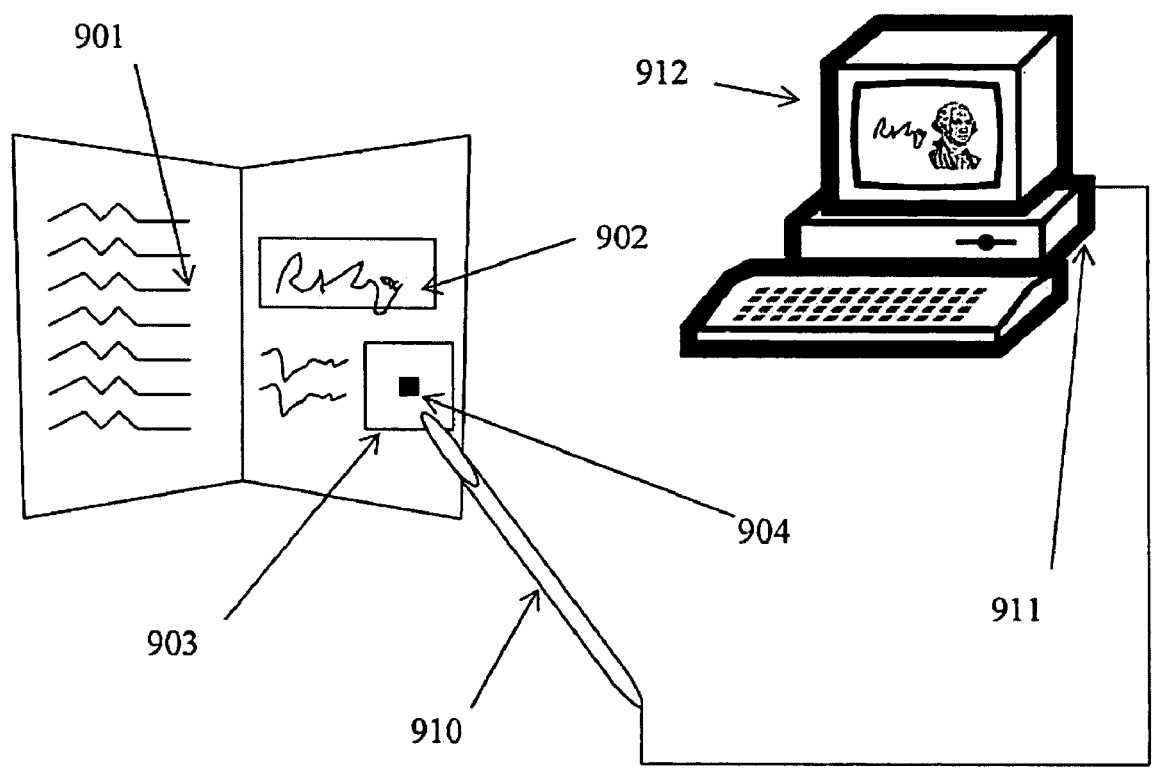
FIG. 9 shows a security document according to an embodiment of the invention and a method for reading it.

There will first be described, with reference to FIGS. 1 to 3, a particularly suitable technology by which memory circuits can be attached to or incorporated within printed documents to enable security documents according to embodiments of the invention to be produced. The memory circuits described, referred to as memory tags, are a form of inductively powered circuit read and written by radio-frequency communication—as such they resemble the existing RFID tag—but it will be appreciated by the skilled person that alternative forms of memory circuit may also be employable for the purpose described. There will then be described, with reference to FIGS. 4 to 6, an exemplary method of printing documents whose content for is divided between a printed document and one or more memory circuits attached to or incorporated within printed documents—the publishing of such documents will also be discussed, particularly in the context of security documents. There will then be described, with reference to FIGS. 7 and 8, approaches that may be employed to physical isolation of a memory tag using tamper resistant or tamper evident technologies. After this, there will be described approaches for protecting information stored in a memory tag against reading by an unauthorised reader. A memory tag with processing capabilities particularly suitable for use in certain embodiments of the invention is discussed with reference to FIGS. 12 to 15. FIG. 9 shows a physical item according to an embodiment of the invention, together with methods of publishing and reading such items in FIGS. 10 and 11. FIG. 16 onwards illustrate a further embodiment of the invention in which the physical item includes data hidden by steganography.

Figure 1:
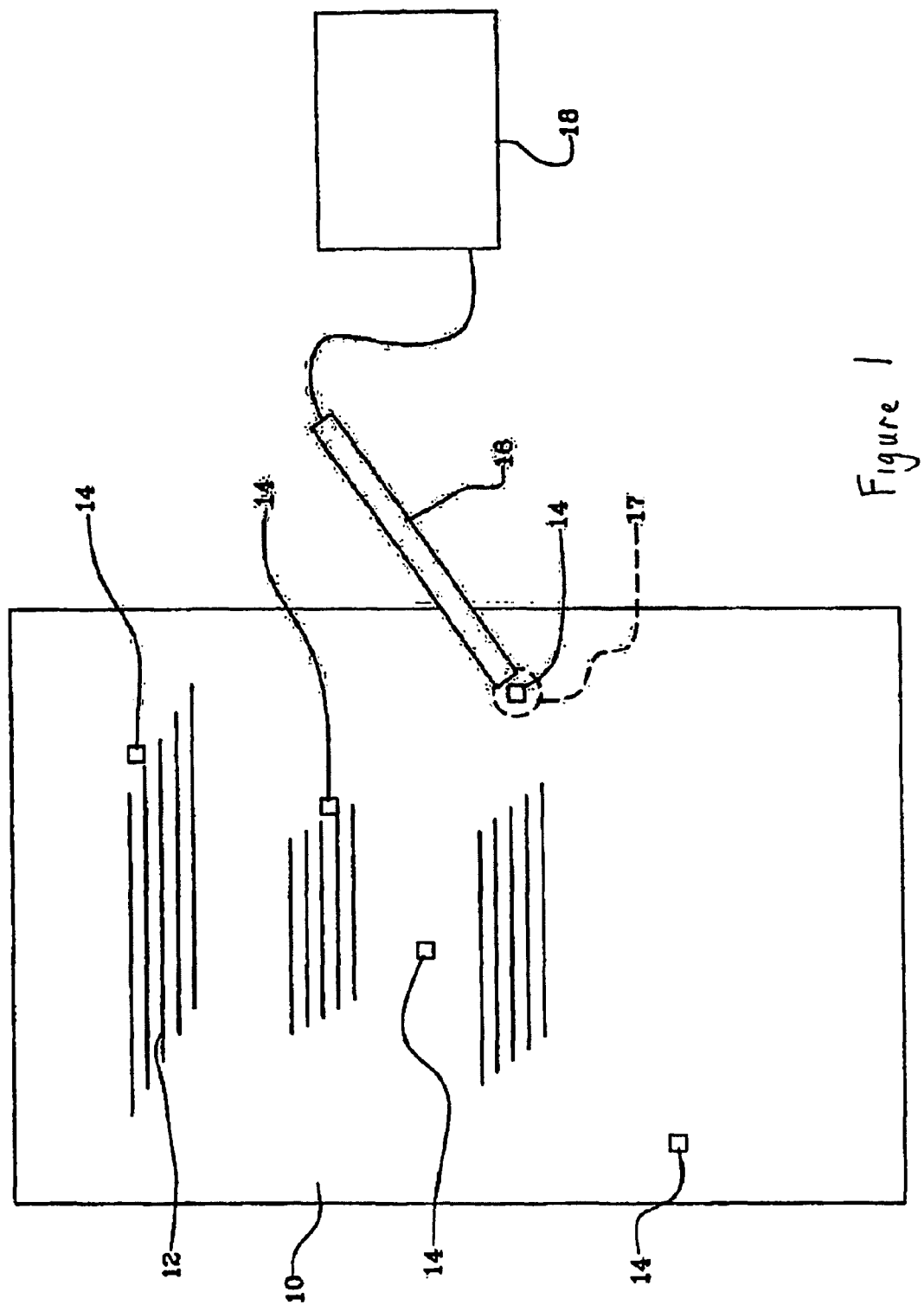
FIG. 1 illustrates a sheet of paper annotated with electronic data in a manner illustrative of an embodiment of the invention.

FIG. 1 illustrates an item, in this case a sheet of paper 10, bearing printing 12, which has been annotated with electronic data using a plurality of memory tags 14. The memory tags 14 have been secured to the sheet of paper 10 at various locations over its surface, although they may alternatively be embedded in the paper sheet 10, preferably in locations identified by the printing 12, in order to assist in locating them for the purposes of reading data from or writing data to the memory tags 14.

A hand held reader device 16 is used to communicate with the memory tags 14 in wireless manner, as will be discussed further below. The reader device 16 is also connected to a host computer, display, data rendering device or other apparatus 18 to which the data read from the memory tags 14 is passed. In the general case for this technology, reader device 16 will also be able to write to the memory tags 14—however, in the case of security documents, this will either be prevented, or such writing will only be in addition to, rather than to replace, security data stored within the memory tag 14.

Figure 2:
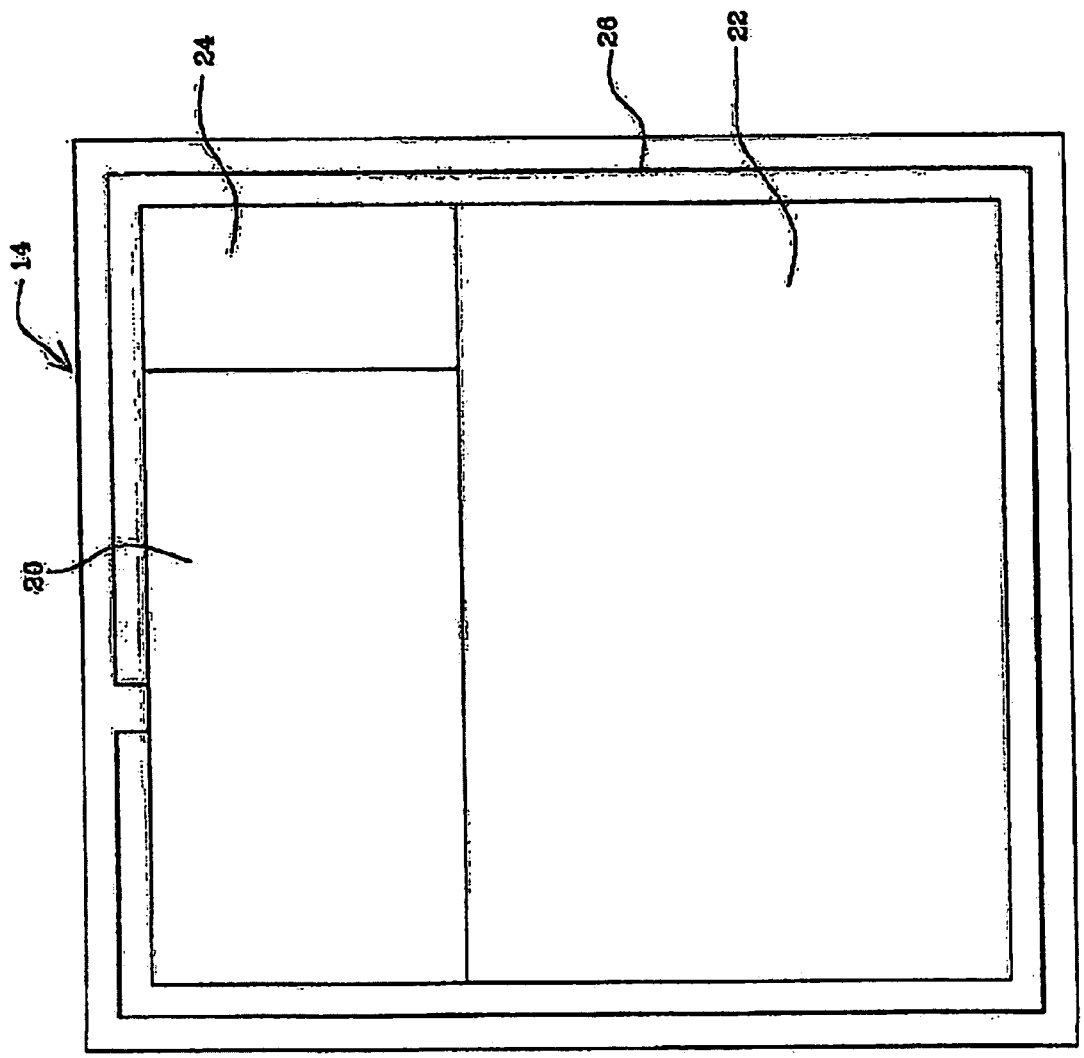
FIG. 2 illustrates an RFID memory tag suitable for use in the embodiments of the invention.

Referring now to FIG. 2, a schematic of a memory tag 14 is shown. The memory tag 14 is an RFID memory tag provided on a chip, and comprises an RFID transponder circuit 20, a memory 22, a power supply capacitor 24 and an antenna coil 26 having only a few turns e.g. five, or as in this case a single turn. The RFID transponder circuit 20 operates at 2.45 GHz, is of an area of approximately 0.5 mm$^2$, and will be described further below. The memory 22 provides 1 Mbit of capacity of non-volatile memory and is of an area of approximately 1 mm$^2$, and may generally FRAM (ferroelectric random access memory) or MRAM (magnetoresistive random access memory) or similar memory technology requiring low power—in the case of security applications, an appropriate form of read only memory (ROM) may instead be employed. The memory tags 14 are of a substantially square shape in plan view with an external dimension D for their sides of around 1 mm.

Figure 3:
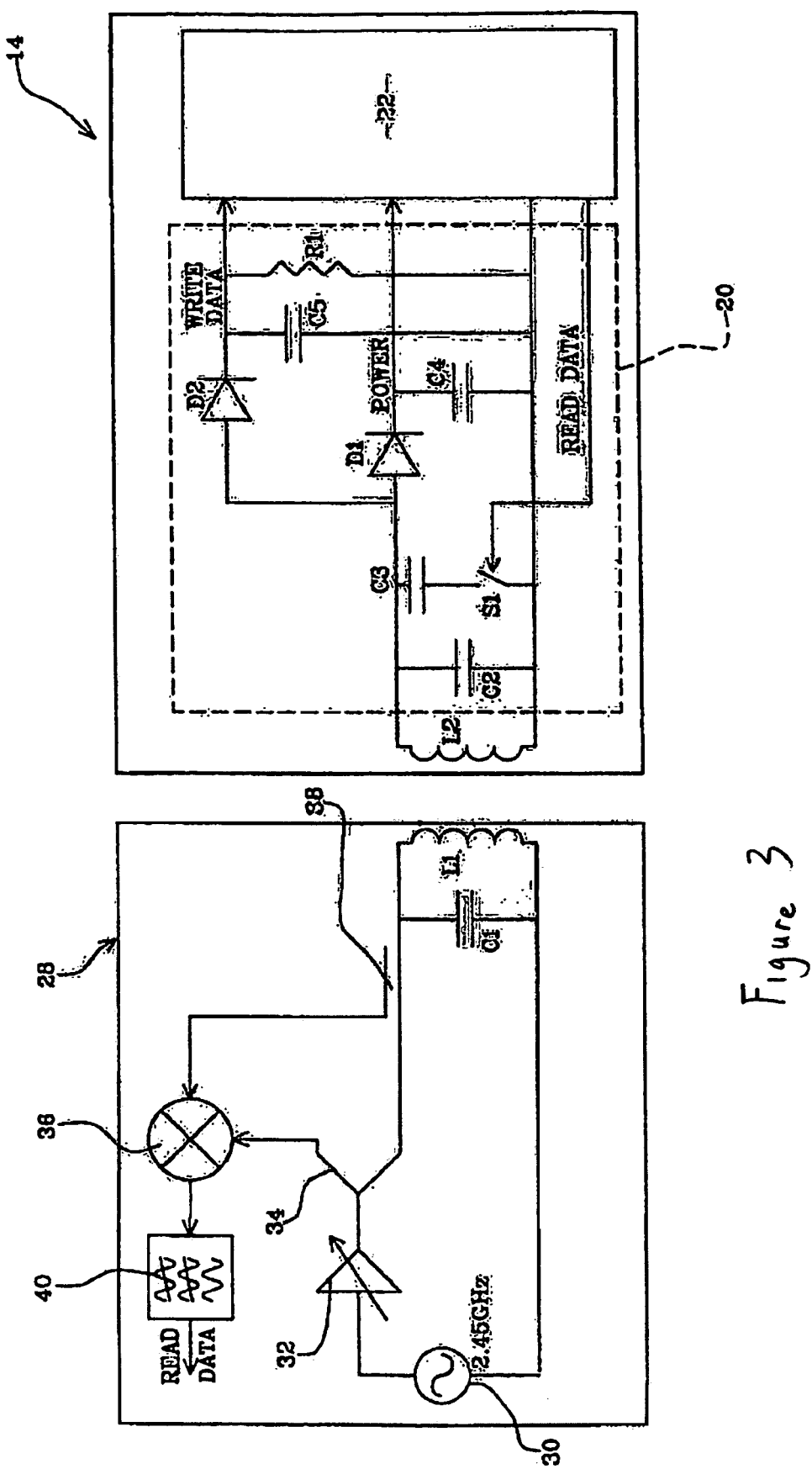
FIG. 3 illustrates the circuitry of the memory tag of FIG. 2 and of a read/write device for wireless communication with the memory tag.

Referring now to FIG. 3, the circuitry of a memory tag 14 and circuitry 28 of the read/write device 16 are illustrated schematically, using conventional component identifications (C-capacitor, L-inductance, R-resistor, D-diode and S-switch). The RFID transponder circuit 20 of the memory tag 14 comprises a capacitor C2 which, in combination with the antenna coil L2(26), forms a resonant circuit with component values being chosen to tune the combination to approximately 2.45 GHz for inductive coupling with the read/write device 16. The portion of transponder circuit 20 responsible for power supply is diode D1 and capacitor C4(24), with diode D1 rectifying the alternating current generated by the inductive coupling and the capacitor C4 acts as a power supply storage. The portion of the transponder circuit 20 responsible for receiving transmitted data from the reader device 16 is diode D2, capacitor C5 and resistor R1 which form a simple envelope detector; the data thus received is stored in memory 22 (in the case of a security document, memory 22 may be divided into RAM which can be written to by the reader 16, and ROM which cannot be so written to—writing to the memory tag 14 may of course be inhibited altogether). The portion of the transponder circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to the reader device 16.

The circuit 28 of the reader device 16 comprises a signal generator 30 which generates a signal at the chosen frequency of 2.45 GHz. This signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to the memory tag 14.

The splitter 34 takes a part (as much as 50% of the power) of the amplitude modulated signal, for use as a reference signal, and passes it to a multiplier 36. The signal received from the memory tag 14, via the tuned circuit L1/C1 and divided from the outgoing signal by a coupler 38, is also passed to the multiplier 36. Thus the transmitted amplitude modulated signal and received signal are multiplied and then pass through a low pass filter 40 to provide a signal comprising the phase modulation from the memory tag 14 and thus indicative of the data read from the memory tag 14. This signal is then passed to the host computer or other device 18 to which the reader device 16 is connected, for subsequent data processing.

One amplitude modulation format which may be used to apply the data to be transmitted to the 2.45 GHz signal is Amplitude Shift Keying (ASK) which only requires the simple envelope detector D2/C5 described in the circuit 20. However, other amplitude modulation formats may also be employed. Further alternatives are Frequency Shift Keying (FSK) and Phase Shift Keying (PSK) that provide near constant envelope modulation, that is without any significant amplitude modulation, however these options have more complex demodulation requirements and thus demand more complex circuitry in the memory tag 14.

With the apparatus of memory tag 14 and reader device 16 described above power transfer of around 25% can be achieved with a distance of around 1.8 mm between the antennae L1 and L2, of the reader device 16 and memory tag 14 respectively. This is sufficient to transfer enough power to the memory tag 14 for it to operate.

The memory tags 14 have an external dimension D of around 1 mm, as described above, and therefore the reader device 16 can communicate with them over a relatively short range, in this example of approximately 2D, (as illustrated on FIG. 1 by broken circle 17). However, the distance over which the reader device 16 and memory tag 14 will communicate effectively will clearly vary with the exact details of their construction, and it may therefore be up to 10D. Distances greater than this would limit the ability to use a plurality of memory tags 14 on a single sheet of paper 10, or other item, due to the distances which would be necessary between the memory tags 14 to ensure that the read/write device 16 does communicate with the desired memory tag 14 out of a number present. To ensure that communication is with the correct memory tag 14 in every circumstance a communication distance of 5D or less is preferable.

The memory tags 14 will preferably have a data rate of 10 Mbitss$^{-1}$, which is two orders of magnitude faster than is typical in prior art devices. Such a data rate would enable the read/write device 16 to be held over the memory tag for a very short period of time ("brush and go") for the data to be read or written as appropriate.

Although the memory tags 14 described above operate at 2.45 GHz it should be understood that memory tags operating at other frequencies may be used to implement the invention. Factors affacting the choice of operating frequency for the memory tags are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

It should further be appreciated that memory tags of this functional type can be produced without using RFID technology. For example, optical technologies can be used to power, read and write to memory tags, as described in the applicant's earlier British Patent Application No. 0227152.6.

Figure 4:
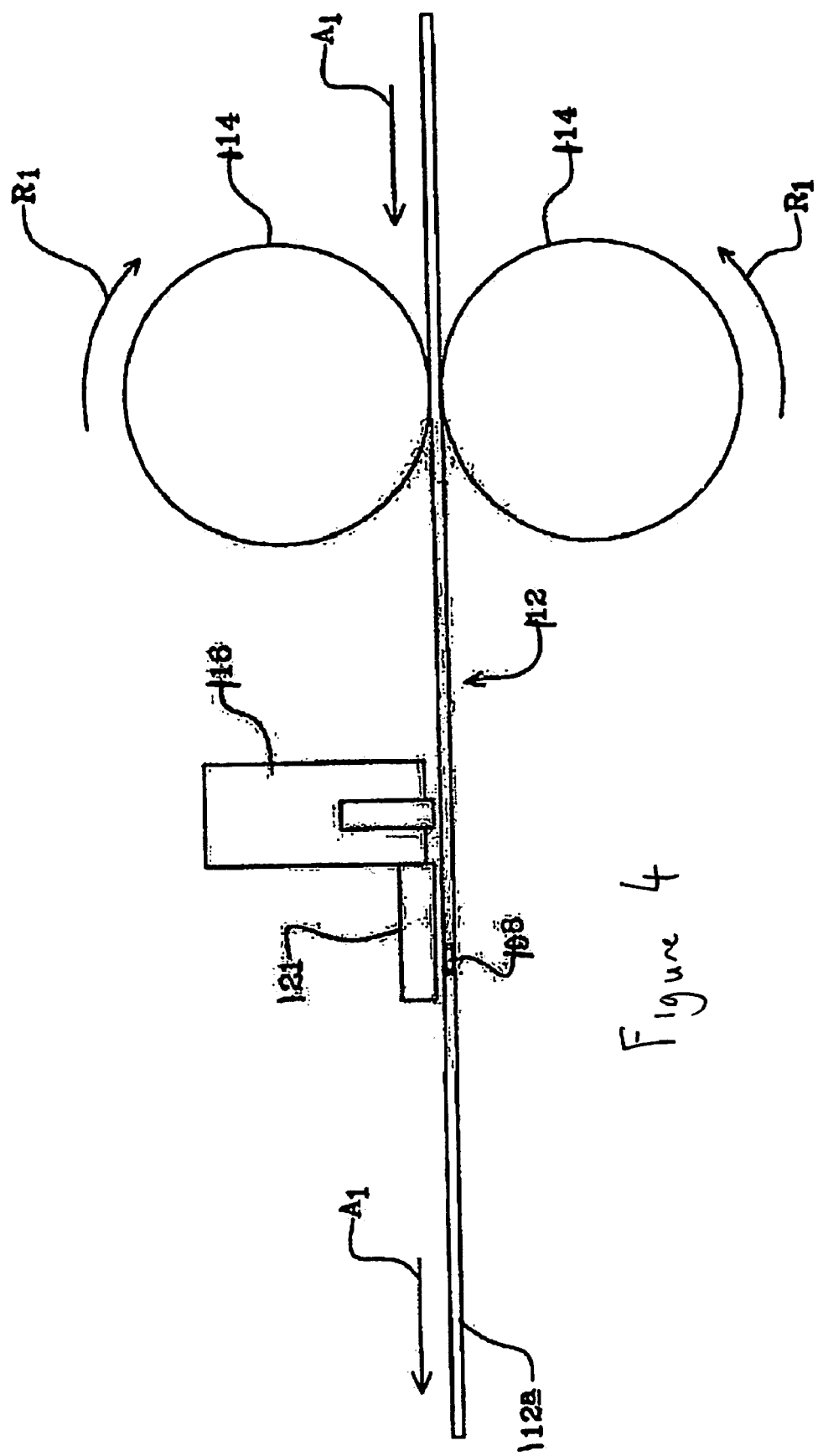
FIG. 4 is a schematic of the main elements of a printing device suitable for executing a method according to embodiments of the invention from the side.
Figure 5:
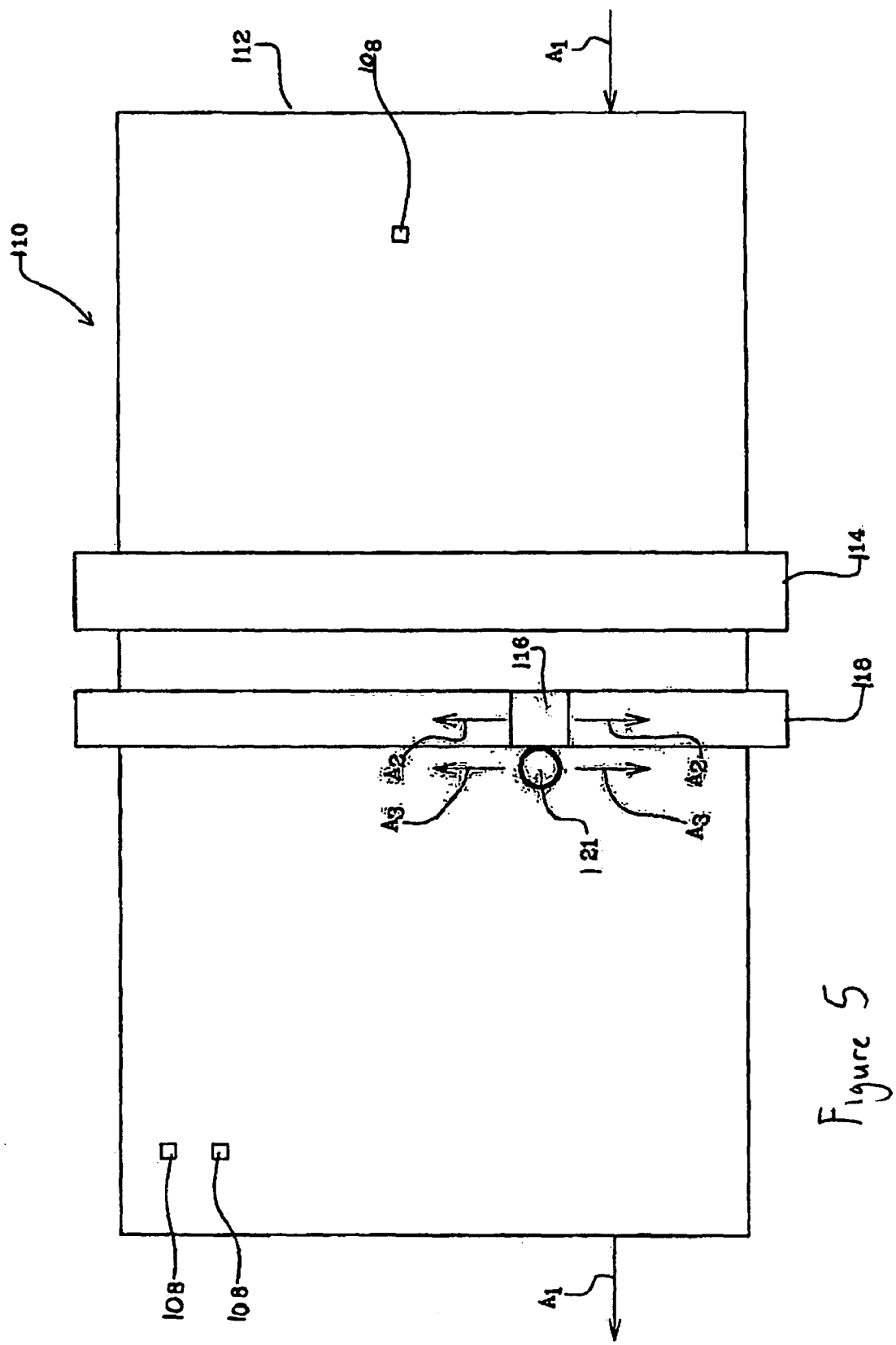
FIG. 5 is a schematic of the apparatus of FIG. 4 from above.

Referring to FIGS. 4 and 5, apparatus 110 for printing onto a base medium and data writing to a memory tag in or on the base medium is illustrated. This embodiment is for use with a base medium in the form of sheet paper 112, to which memory tags 108 have been applied or within which memory tags 108 have been embedded (as shown in FIG. 4). The memory tags 108 are RFID memory tags for which the manner of writing data to the tags and reading data from the tags is well known (see above, but in addition for example the RFID Handbook, Klaus Finkenzeller, 1999, John Wiley & Sons). For simplicity only those parts of the apparatus 110 which need to be shown to describe the invention are illustrated and described. It will be understood that the apparatus 110 includes much known technology from the prior art of printers, and from the prior art of RFID memory tags, which is not described here.

The apparatus 110 includes paper feed rollers 114 which are driven to rotate as indicated by arrows R1 to feed the paper sheets 112 through the apparatus 110 along a first axis in the direction indicated by arrows A1.

The apparatus 110 further includes a print head 116, which in this example is of ink jet form, mounted on a print head carriage 118 which extends across the apparatus 110 substantially perpendicular to the axis A1. The print head 116 is moveable back and forth along the print head carriage 118, in known manner. Thus the print head 116 is moveable back and forth along a second axis indicated by arrows A2, substantially perpendicular to the axis A1, to enable the print head 116 to access most of the upper surface 112a of the paper sheet 112 as it moves through the apparatus 110, and thus to print anywhere on that accessible area of surface 112a as required.

The apparatus 110 also includes a memory tag read/write device 120 which operates in known manner to write data to and/or read data from memory tags as required using an inductive coil 121. The inductive coil 121 of the memory tag read/write device 120 is connected to the print head 116 for movement back and forth along the print head carriage 118 with the print head 116. Thus the inductive coil 121 is moveable back and forth along a third axis indicated by arrows A3, substantially perpendicular to the axis A1, and parallel to the axis A2, to enable the memory tag read/write device 120 to read data from and/or write data to memory tags 108 located anywhere on or in the accessible area of the paper sheet 112, as will be described further below.

Figure 6:
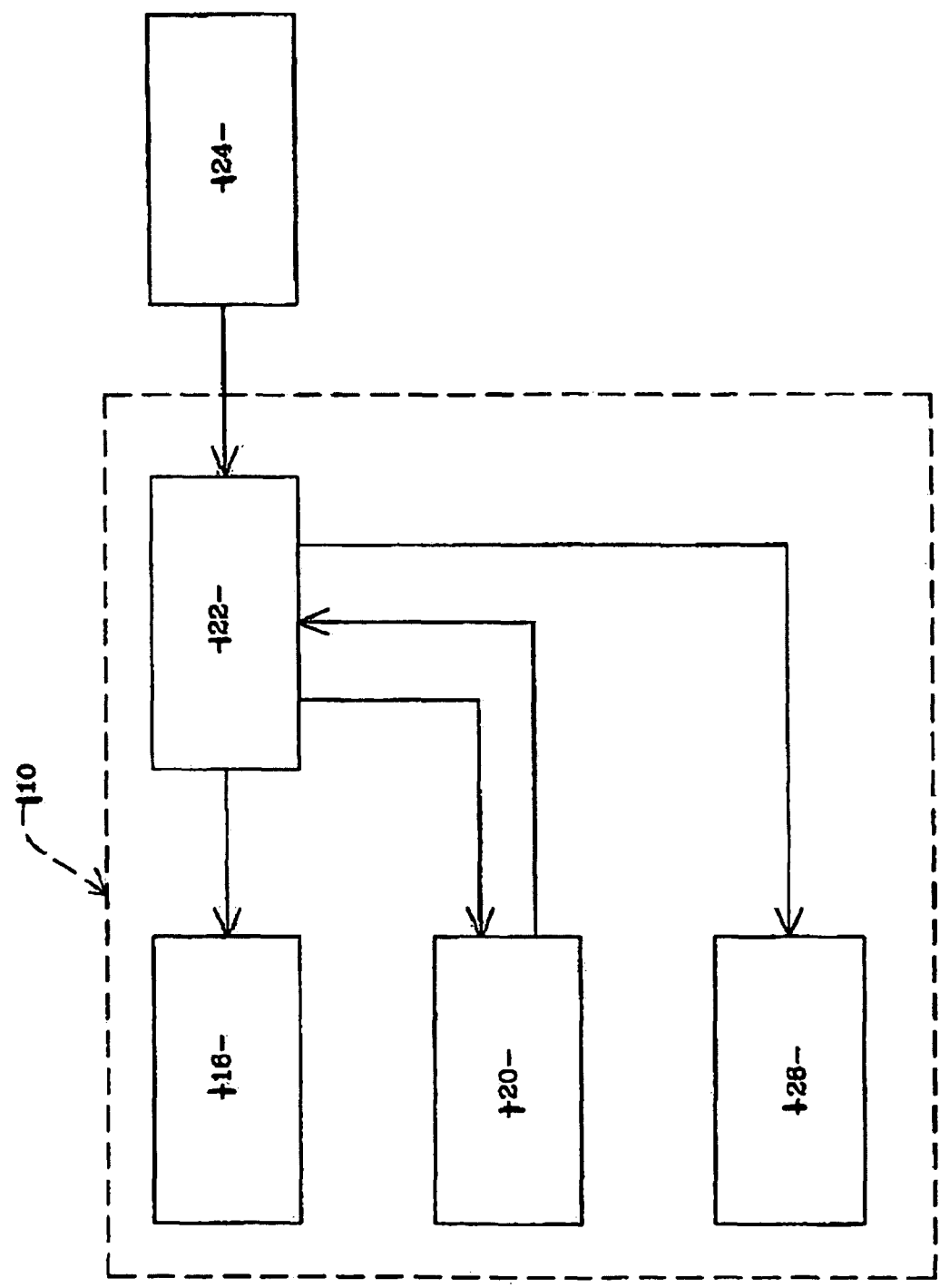
FIG. 6 is a block diagram of the control of the apparatus of FIGS. 4 and 5.

Referring now also to FIG. 6, the apparatus 110 also includes a main processor 122 and a mechanics controller 126, which controls all the mechanical operations of the apparatus 110, (i.e. the paper feed rollers 114, the movement of the print head 116 and inductive coil 121 along the print head carriage 118). The main processor 122 receives instruction signals from a host computer 124, including the details of:

what to print;
where to print it;
where the memory tag 108 is or tags 108 are in/on the paper sheet 112; and what data to write to the memory tag(s) 108.

The main processor 122 sends command signals as required to:

the mechanics controller;
the print head 116; and
the memory tag read/write device 120, to implement the instruction signals.

Thus the paper sheet 112 is fed through the apparatus 110 and has the required information printed on its upper surface 112a. At the same time the memory tags 108 on or within the paper sheet 112 have the necessary data written to them by the memory tag read/write device 120, with the movement of the memory tag read/write device 120 (and print head 116) being paused with the memory tag read/write device 120 over the or each memory tag 108 as necessary for the data writing to take place.

The manner of co-ordination of the printing and data writing processes will depend on a number of factors. If, for example, the memory tags 108 are only present adjacent the top and/or bottom of the paper sheet 112 then the data writing process can take place before and/or after the printing. This would avoid the necessity for the printing process to be interrupted, and would make the co-ordination simpler. Further, when implemented with an inkjet printer, which in general requires a pause, after printing has been completed before the paper sheet is ejected, to allow the ink to dry, the data writing process could conveniently take place during this pause for memory tags present adjacent the bottom of the paper sheet 112.

In embodiments of the invention, the memory tags 108 will typically be read by hand held readers. Thus in order to assist users in the future to locate the memory tags 108 on the paper sheet 112 the memory tags 108 may have icons printed over their locations which can be readily identified by users. It is of course possible in the case of security documents that the location of memory tags 108 may not be advertised in this fashion, and that the position of memory tags may be concealed or multiple memory tags, some of which contain deceptive content, are provided, and that part of the authorisation information received by an authorised reader of the document is the knowledge of which memory tag 108 contains the valid information.

The memory tag read/write device 120 may, in addition to writing the data to the memory tags 108, also conduct a read operation to check that the data has written successfully before the paper sheet 112 is moved on following the data write operation. Alternatively, particularly if the apparatus 110 is operating at high speed, a separate data check device (not shown) may be included in the apparatus such that this operation takes place downstream of a memory tag write device which in this case need not also be capable of data reading.

It will be readily appreciated by the person skilled in the art that the modification to a conventional printing technology (in this case, the functional structure of the printing device is that customarily found in inkjet printing technology) can be employed to functional structures used in other printing technologies, such as laserjet and digital presses (such as HP Indigo presses). This last technology is particularly suitable for mass production of documents, for example book publication.

It can be seen from the above that there is no fundamental complexity involved in creating and publishing documents in accordance with embodiments of the invention using printing technology described in FIGS. 4 to 6. As for the content generation stage, conventional word processing and web publishing software (such as Microsoft Word and Microsoft Frontpage respectively) familiarly allows inserts of data of a different data type—in web publishing in particular, it is familiar to determine an icon for rendering that has a hyperlink function and can serve, if activated by a reader of the document, to link to another page or a file (such as a sound clip). Essentially the same approach can be taken here—the user composing the document on host computer 124 can place or identify a memory tag position on the page being composed and may designate a particular file to be stored in that memory tag. The document for printing, the files for the memory tags, and all placement information can then be provided by the document generation software on host computer 124 to the main processor 122 of the printing device for rendering as described above.

The security document contains at least two discrete forms of protection for the security information stored in the memory tag: protection against physical tampering, and protection against unauthorised reading. These will be considered in turn, together with any modification to the basic technology described above (in many cases it will be necessary for the physical isolation step to be completed after the document creation stages indicated above—in particular, to convert the memory tag to a read-only one, either by physically modifying the memory tag structure after writing or by preventing write access to the memory tag).

As the memory tag is both read and powered wirelessly, it is possible for it to be physically isolated (by encapsulation or otherwise). This physical isolation needs to be such that the memory tag can still be powered and read, and such that it can still be incorporated within or attached to the printed document. It is possible to protect the memory tag against the effects of physical tampering and still accept these constraints. Approaches to protection against tampering include using tamper-evident protection, and using tamper-resistant protection. Examples of each will now be described.

Tamper-evident protection does not itself prevent physical tampering. It does, however, show when physical tampering has occurred. For tamper-evident protection, it is necessary only that physical tampering will result in irreparable effects to the physical document that will be apparent on subsequent inspection. An example is the tamper-evident signature strip described in U.S. Pat. No. 5,762,378, in which the fabric of the tamper-evident area is weakened by a pattern of cuts through the paper substrate (illustrated in exemplary fashion in FIG. 7) in such a way that the cuts 701 through the paper substrate 702 in the tamper-evident area 703, which here also includes a memory tag 704, are such that attempts at physical modification within the tamper-evident area 703 will lead to irregular tearing patterns.

Tamper-resistant protection, by contrast, aims to prevent physical tampering. By "tamper-resistant", it is not here implied that a tamper-resistant device is immune to all forms of tampering, however technically sophisticated. As is described in the literature of tamper protection (see, for example "Tamper Resistance—a Cautionary Note", by Ross Anderson and Markus Kuhn, published in "The Second USENIX Workshop on Electronic Commerce Proceedings", Oakland, Calif., Nov. 18-21, 1996, pp 1-11), most forms of tamper resistance can be overcome with sufficient time, money, and technical sophistication. Here, it is understood that protection is "tamper-resistant" if it is sufficient to increase significantly the level of difficulty for an attacker in achieving effective physical tampering.

As indicated above, a significant consideration in achieving effective tamper-resistant protection is that the ability to read data from the memory tag should be preserved. Full electromagnetic shielding of the memory tag—one known tamper-resistance technique—is thus not an option. A technique which may be an option, however, is effective design of the memory tag antenna. FIG. 8 shows an antenna structure for tamper protection. An antenna 801 on a Mylar sheet 802 is attached through an earth plane sheet 803 to the memory tag 804—the whole assembly being encapsulated and fixed on to the paper document (not shown). Advantageously, the memory tag in this arrangement may be written to, and then physically prevented from being rewritten, before the construction of the tamper-protected device. The meandering structure of the antenna (which may of course be a great deal more complex than shown here) has a secondary use as an inhibitor of the memory tag. A physical property of the antenna (such as its impedance, or time of flight along it) may be measured by the memory tag (which therefore will need to be provided with appropriate measurement circuits—the construction of which will be readily determinable by the skilled person) and compared with a known value. If this value is not returned, this will be taken as indicative of physical tampering (for example, the shorting together of two adjacent wires in the antenna) and the memory tag will not allow itself to be read by any reader.

Additional tamperproofing technologies, some but not all of which are applicable to the present use (again, this will be clearly evident to the person skilled in the art) are discussed in the applicants European Patent Application Publication No. 1273997. Again, for many of the techniques described here it will be desirable to write to the memory tag and to physically prevent further writing to the memory tag (or to a specific memory of the memory tag) before completing the tamperproofing process itself.

In addition to physical resistance to the effects of tampering, the memory tag itself provides security protection in that the information it holds is only usefully accessible to an authorised reader. This can be achieved in a number of ways, depending on factors such as the degree of security required, the length of time for which security is required, and the processing capacity (if any) available on the memory tag itself. Options, in ascending level of security, are described below.

(1) Pure Memory without Additional Security Features on Tag—all Security Operations Take Place Before Writing to Tag.

The security operations in this case take place on or before writing—for example, that the data stored in the memory tag is written with a secret. (For example, a hash function is used to take a hash over the picture of the holder, their access permissions, a reference to any credentials they produced when the badge was first created, and so on. The hash is authenticated using a secret shared among all authorised readers which could then be used (for example) as the access code in a keyed hash or MAC (Message Authentication Code). This may work very well in short term applications (eg entry to a specific event), but is less readily applicable to circumstances in which it is desired to write to the memory tag, particularly where it is necessary for the memory tag to contain updatable state information.

(2) Memory Tag with Unique ID

This provides substantial advantages for applications where writing to the memory tag is necessary. Each write to the memory tag which wishes to preserve integrity now incorporates the spot's unique ID in the hash which is MACed or signed; and each validator asks the spot afresh for its unique ID in recomputing the information-to-be-validated. This makes casual copying from one memory tag to another detectable, as the difference in unique IDs between the original and the clone will cause the hash comparison to fail.

There are a number of ways to create a unique ID. For maximum trackability, the format of a unique-ID may be (or is the unkeyed hash of) a manufacturer ID: week code: batch code: sequential number. An untrackable approach would be for the memory tag to contain a hardware-based random number generator (RNG), and upon first activation (maybe during manufacturing test) the RNG runs, the resulting unique-ID is written into write-once storage, and the writeability of that storage is reliably and permanently disabled. There's also a choice over how the unique ID is made accessible to the readers and writers: this can range from returning a raw ID to returning only a hash of a random number supplied by a reader with the unique ID. For random generation, to prevent clashes it would be desirable to have at least 256 bit unique Ids.

(3) Memory Tag with Unique ID, and On-Spot Hashing (with Some Access-Protected Storage)

This is the lowest security level which requires processing capacity on the memory tag. It is suitable for applications in which duplication of credentials must be detectable. It is particularly suitable where the memory tag should be relied upon to deliver results of processing over data it doesn't directly reveal, should be able to self-check the integrity of data it stores, or should be able to participate in providing confidentiality for data it stores.

Without its own processing, the memory tag needs to rely on the other components of a writing/reading/credentialing/validating system to hold all long-term and short-term secrets. A first cryptographic processing technology to employ in the tag itself is hashing, with SHA-1 being a logical choice of hash function. Hash functions are fast to execute, use relatively little RAM and code space, and are a building-block for reliable integrity checks.

One immediate use of an on-chip hashing capability is to hide the raw unique ID value from readers, instead of reporting the result of hashing that ID and a reader-supplied value. The use of that additional value would vary: it may be recorded alongside information recorded on memory tag, to allow a later recalculation of a hashed value; it may in other uses be a secret which is deliberately not recorded on the memory tag, allowing for a hash value recorded on the memory tag to be revalidated only by a validator which knows that secret value. An on-chip hashing function would also allow the memory tag to implement cryptographically-protected write-once storage, using a rolling hash of the data written into the "update-only" memory keyed with the unique ID so that the memory tag itself can report the integrity of the append-only log.

Using the hash function, it is possible to implement on-chip encryption. Briefly described, this can be done by hashing (a transform of) the unique ID and the starting address of a block of memory to create a pseudo-random stream which we XOR against the block of memory. What is stored is that encrypted form, while to read it out to a suitably-privileged reader (that would be a reader who can supply the extra secret needed for the transform of the unique ID) we recreate the keystream and XOR it against the stored data to derive plaintext.

Arrangements of this type allow for the possibility of access control: that areas of memory may be either encrypted or simply not returned to a reader unless that reader provides some suitable secret. The hash-derived keystream provides one way of doing that, with the chip returning contents of memory locations either as-they-are or XORed against a keystream determined by a combination of the unique ID and a reader-supplied quantity (a similar approach can be applied to writing). This still leaves the chip responding to all requests from all readers to read memory (with the notable exception of the uniqueID itself), relying on the result to be unintelligible without the correct key having been supplied. It may in some cases be advantageous to give the chip the capability of simply not responding to particular commands, and/or parameter values for some commands (for example, particular address ranges), unless the reader can supply an authentication value (or prove knowledge of an authentication value).

(4) Memory Tag with Unique ID On-Spot Hashing and Asymmetric Cryptographic Capability This is appropriate where the memory tag has responsibility for control of data it stores, and can receive and transmit data with confidentiality and integrity. It is not apparent that many applications will require this approach to security, as the overall security of the system will generally be better improved by considering another aspect of the system (such as secure handling of authentication information provided to authorised readers).

Adding asymmetric cryptographic capability—RSA and elliptic-curve capability are both possibilities—to the spot has some notable costs: the codespace and memory requirements are non-trivial, the execution times for public-key operations are substantial (whole seconds), the management of key material and partial results becomes more complicated, and if the memory tags are expected to understand standard-format certificates too, the processing requirements go up some more. The advantage, though, is that we get a well-understood way of both validating data as having come from the memory tag, and sending it data which only it can read, without having to share the material for creating the validation and decrypting the data with any entity outside the memory tag (whether it's firmware in the reader/writer or code executing on a conventional host—PC, PDA, or similar).

(5) Memory Tag with Unique ID On-Spot Hashing, and Both Asymmetric and Symmetric Cryptographic Capability This is useful where the memory tag is required to be a self-standing cryptographic object implementing a sophisticated information management policy. Again, the number of application scenarios where this will be appropriate may be rare. This is in part because the memory tag doesn't have human-interface capabilities of its own: so although it is now capable of doing symmetric cryptography as well as asymmetric, any bulk data it is handling still has to be passed, as plaintext, either into or out of the memory tag to interact with a person (be read, listened to, dictated in, or whatever). Thus, you have to trust the interaction device not to violate your security policy—i.e. to handle that valuable plain text resulting as securely as the highly secure memory tag.

A suitable processor for use in a memory tag to achieve functionalities as taught in sections (3) to (5) above is now described with reference to FIGS. 12 to 15. This processor is fully described in the present assignee's copending U.S. patent application Ser. No. 11/359,458 entitled "Memory Tags With Write Only Memory And Reader Devices And Methods Of Use Therefor", filed on 23 Feb. 2006, which is incorporated by reference herein. A further memory tag processor design, not discussed further here but also suitable for achieving elements of the functionality described above, is described in the present assignee's copending U.S. patent application Ser. No. 11/294,479 entitled "Central Processor For Memory Tag", filed on 6 Dec. 2005 and also incorporated by reference herein.

Figure 12:
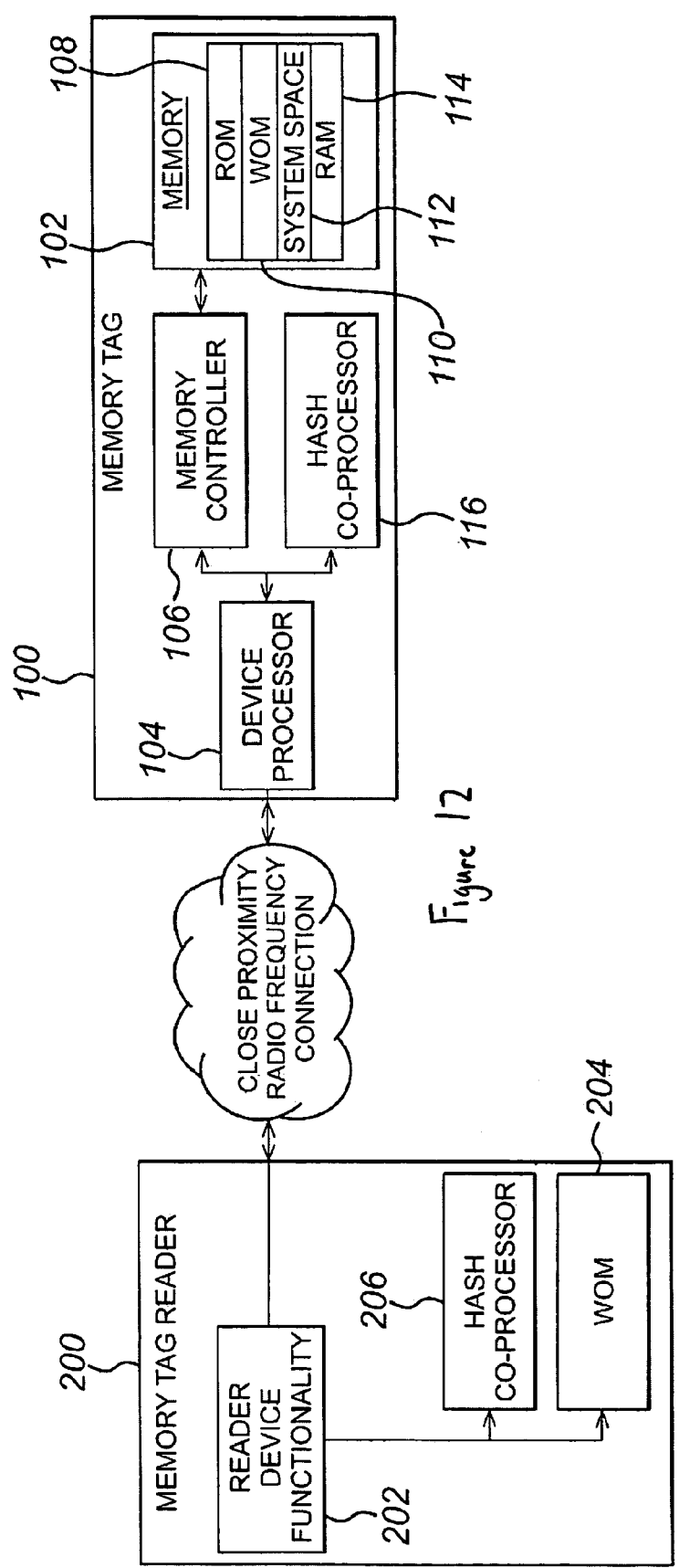
FIG. 12 shows schematically a memory tag and reader according to an embodiment of the invention.

FIG. 12 shows schematically a memory tag reader and a memory tag suitable for use for embodiments of the present invention. In addition to the basic elements of a memory tag and reader discussed earlier, the following elements are also provided.

Firstly, the memory 102 of the memory tag is sub-divided into a number of memory types. There is an area of read-only memory (ROM) 108, an area of write only memory (WOM) 110, an area of system space 112 and an area of random access memory (RAM) 114. Each area of the memory 102 is controlled, in the preferred embodiment, by the memory controller 106 under the control of the device processor 104. The memory tag 100 in this case also incorporates a hash co processor 116—it will be appreciated that to achieve alternative security functionalities, alternative co-processor function may be provided.

The read-only memory 108 is a portion of memory which may, for example, be a single memory location, in which a global unique identification (GUID) that is assigned to the memory tag is stored. This global unique identification (GUID) is generally assigned to a tag upon its manufacture, that is it is stored in the ROM 108 when a tag is made. Alternatively, the global unique identification (GUID) may be written into the ROM 108 by the person/establishment, etc, issuing the tags prior to issuance. The area of ROM will then be locked such that it may no longer be modified.

The write-only memory 110 is an area of memory that is locked for the purposes of reading. This, for example, may consist of memory areas 2 to 31 (when the global unique identification is stored between memory addresses 0 and 1). This memory may only be written to by a write enabled reader device 200 accessing the memory tag. It may not be read. Should a memory tag reader device, such as device 200, attempt to read the memory addresses within the write-only section of memory 102, an erroneous response such as "0000" will be returned. The information stored at the memory addresses in question will not be provided to the reader device. Of course, the device processor 104 of the memory tag 100 is able to read the contents of the write-only memory 110 within the memory tag 100.

The system space 112 within the memory 102 is a portion of the memory 102 for use by the memory tag 100 itself in carrying out its operations. Finally, the random access memory 114 is an area of general storage within the memory tag. This area of the memory is utilised to store data on the memory tag, the purpose of memory tags, and is accessible by the reader device 200 for both reading and writing as required. Of course, this area of the memory tag memory 102 need not be non-volatile RAM. It may, for example, consist of non-volatile FLASH MEMORY or ROM.

The hash co-processor is a module within the memory tag 100 data stream which receives, via the device processor 104 and/or memory controller 106, a variable length input and performs a hash function upon that input. The output of the hash co-processor is therefore a fixed size bit stream known as a digest. Any cryptographically secure hash function may be used in the hash co-processor 116 of the present invention. For example, the hash functions MD5 or SHA1 may be utilised. However, in the preferred embodiment, an optimised version of SHA1 is run by hash co-processor 116. The SHA1 hash function is a secure hash function which receives a variable size stream of data (i.e. bytes) and produces a 160 bit digest in response to whatever data stream is supplied to it. Moreover, SHA1 is a one-way hash function, i.e. it is not possible to look at the digest produced by SHA1 and work backwards to find the data which was input to the function to produce the digest. SHA1 is particularly secure. It cannot be run backwards even to guess the last two or three digits of the input data sequence.

In its full implementation, $2^{64}$ bits of data can be input to the SHA1 function before the digest produced by the function starts to repeat. SHA1 splits received data into blocks and processes one block at a time in order to produce the digest. However, in the optimised version which is preferably used in the hash co-processor 116 of the present invention, only one block, of 480 bits for example, is provided to the co-processor. This reduces significantly the time taken and power utilised to produce the digest.

It can be seen from FIG. 12 that the memory tag reader 200 also incorporates an area of write-only memory 204 and a hash co-processor 206. These elements have the same characteristics and operate in the same fashion as their counterparts in the memory tag 100. For example, the hash co-processor 206 will always employ the same hash function as the co-processor 116 in the memory tag. In fact, the hash co-processor 206 and the read-only memory 204 provided in the memory tag reader 200 may be provided in the form of a memory tag 100 operating as a co-processor within the reader device 200. However, in alternative memory tag reader devices there may be provided only the hash co-processor and write-only memory in addition to usual reader device functionality. All other functions may be provided through the reader device processor for example. This will prevent the presence of elements of a memory tag that are redundant when utilised as a co-processor in the memory tag reader 200.

Figure 13:
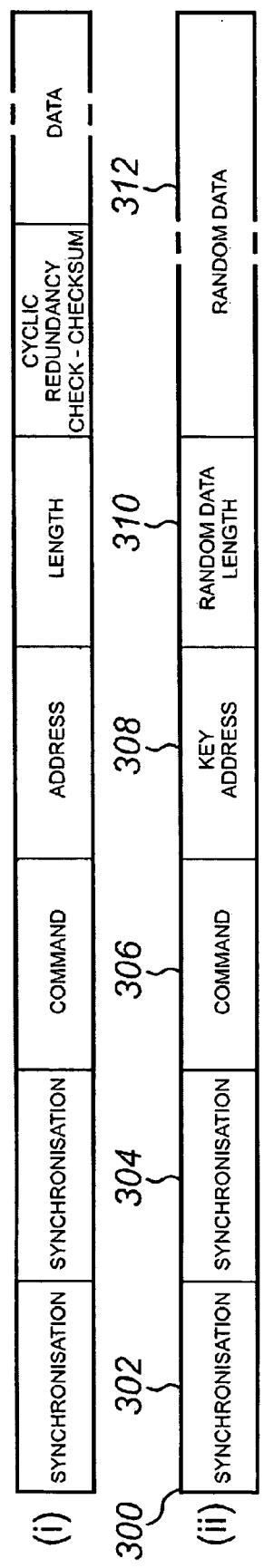
FIG. 13 shows a prior art data packet structure and a data packet structure for use in authenticating a memory tag according to an embodiment of the invention.

The way in which the additional functionality described above with reference to FIG. 12 operates to provide a high confidence of the identity of a memory tag that is being read will now be discussed. Firstly, referring to FIG. 13, both a prior art data packet and a data packet utilised in authenticating a memory tag, for example, according to embodiments of the present invention, are shown. FIG. 13(i) shows a data packet which incorporates two synchronisation fields followed by a command field, an address field, a length field, a cyclic redundancy check field and a data field. In such a data packet, the command field will be populated with either a read or a write command. This packet structure may be used when performing a read or a write operation on a memory tag using a memory tag reader device, with write capability as necessary. However, a further command is required in order to enable an "authentication function" to be carried out. Accordingly, a data packet as shown in FIG. 13(ii) is required. Similarly to the prior art data packet, this data packet 300 incorporates two synchronisation data fields 302 and 304. These are followed by a command field 306. The command field may be populated with either a read command, a write command or an authenticate command. Where the command field is populated with an authenticate command, the next field in the data packet is a key address 308. This indicates the address at which key sequence data (as will be discussed in more detail below) commences within the write only memory area 110 of the memory tag 102. The key address field is followed by a random data length field 310, which specifies the length of the random data that will follow. Finally, a random data field is included in the data packet. The data in this field must be random as will be described later. The random data field is numbered 312 in FIG. 13 (ii).

In one suitable embodiment, the data packet which enables authentication omits a cyclic redundancy check-check sum data field. In this embodiment, the memory tag can be scanned many times by the memory tag reader device 200. However, in an alternative embodiment, a cyclic redundancy check data field may be included in the data packet. In this case, the memory tag reader will know, by virtue of the use of cyclic redundancy checking as is known in the art, that the packet was sent and received correctly, and the memory tag need only be scanned once by the memory tag reader 200. Hence, if the data returned to the reader device 200 from the memory tag 100 is incorrect, it is known as will be discussed below, without the need for further scans of the memory tag 100, that the memory tag 100 is not authentic.

The use of the architecture set forth in and with respect to FIGS. 12 and 13 will now be described with reference to FIG. 14, and utilising the example of a museum entry access system. A museum wishing to utilise memory tags to enable its patrons to gain access a given number of times will purchase, for example, a number of blank memory tags suitable for use according to embodiments of the invention. As is discussed further below, these may be incorporated into physical items in accordance with embodiments of the invention. As already discussed, these memory tags may have a global unique identification pre-assigned in the read only memory area of the memory tag. Alternatively, the read only memory area will be unlocked at delivery and blank to enable the museum to insert its own global unique identifier in the memory tags and to lock the read-only memory area once this is done. In a preferred embodiment, the global unique ID may be 1024 bits long.

In order for the entry access system to be effective, the museum must have what may be termed a "clean room" in which is located a memory tag read and write device 200. This device is the device utilised to issue key sequences to memory tags, i.e. to write a selected piece of data into the write-only memory area of each tag that is to be issued for use as a museum access device. The clean room is a room that is completely secure. Only authorised personnel are able to obtain access to that room and therefore only authorised personnel will know the key that is stored in the write-only memory area of issued memory tags.

The museum takes the blank tags which are purchased and, utilising the read and write device 200 within the clean room, writes one or more key sequences into the write-only memory area of these memory tags. Each tag is preferably provided with WOM sized to accommodate 2*16*240 bit key sequences, as are the reader devices. The memory tags are also configured to allow a predetermined number of accesses to the museum. The museum then issues these memory tags to museum patrons. When a patron wishes to gain access to the museum, for example, the memory tag is brought into close proximity to a memory tag reader device 200 that is present in the museum entry portal. Bringing the tag into close proximity causes it to be powered up and to interact with the reader as discussed above. Upon authentication of the tag and the data within the tag, access is granted.

Figure 14:
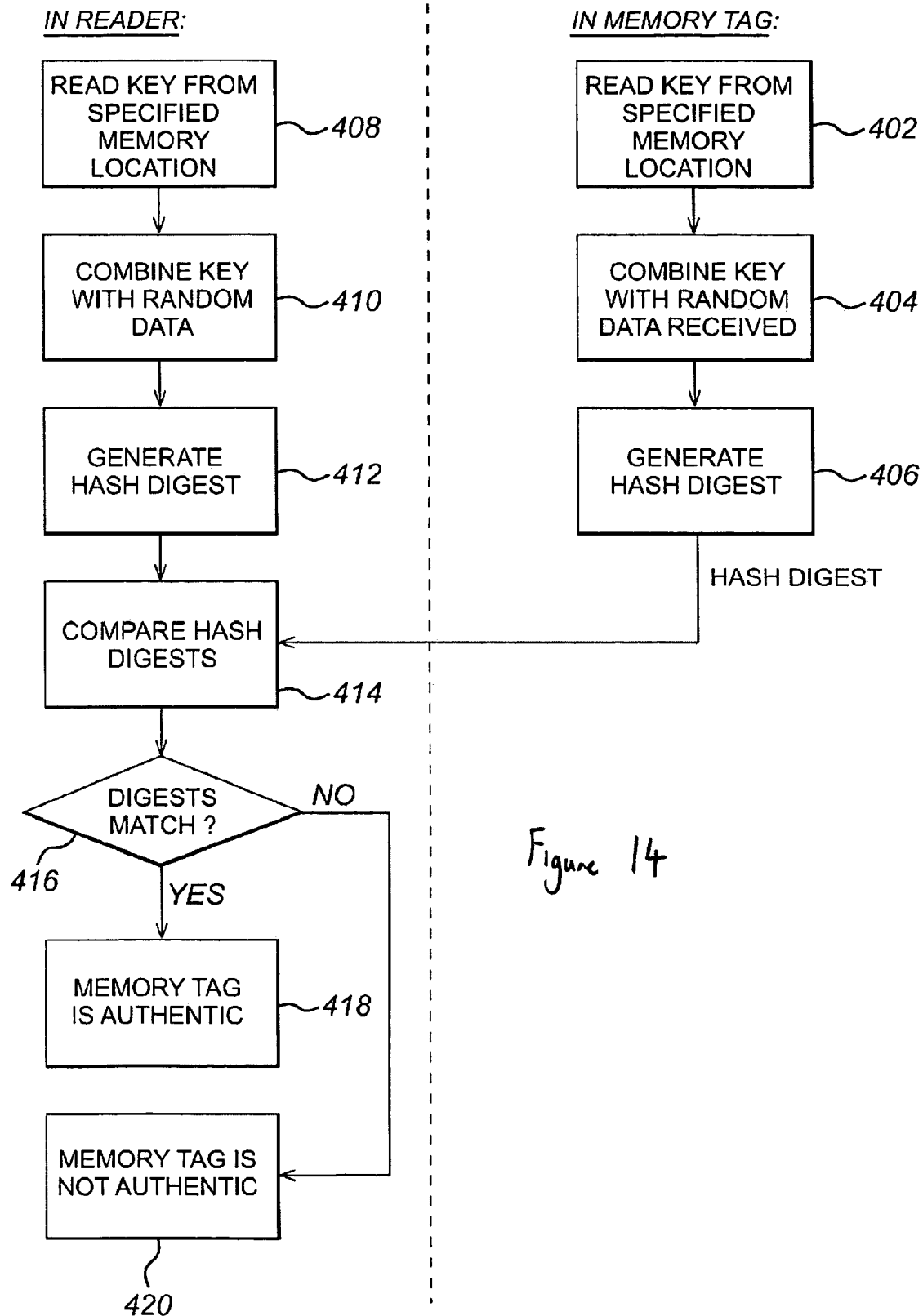
FIG. 14 shows a flow diagram depicting a process of authenticating a memory tag according to an embodiment of the invention.

Referring to FIG. 14, the process of determining whether a memory tag 100 presented to a memory tag reader 200 is authentic (in the example of the museum access tag given above, determining that the memory tag presented to the reader is a memory tag issued by the museum rather than a copy or clone thereof) is described. As already mentioned, when a memory tag is issued in the museum access example given above, a key sequence which is known only to certain museum personnel is written into the write only memory area of the memory tag. At the same time, the same key is written into the write-only memory area 204 in each memory reader device 200 that is to be employed to read that tag 100. For the purposes of this example, the key sequence will be represented by the sequence "ABC", but the key sequence may be any combination of letters and/or numbers and/or symbols. This is a secret key sequence known only to the personnel who operate the clean room in the museum and it cannot be read from the write only memory area 110 in the memory tag 100 other than by the memory tag device processor 104. Similarly, it cannot be read from the write only memory area 204 in the memory tag reader other than by the memory tag reader device 200 processor. Of course, the key may be used in any number of memory tags 100.

When a patron of the museum arrives at the museum portal and wishes to gain access, the memory tag 100 is presented to the reader 200 on the door, as already discussed. In order to authenticate the tag as a tag issued by the museum, the reader device 200 on the door of the museum sends an authentication data packet, as shown in FIG. 13 to the memory tag 100. Upon receiving an authentication command, the device processor 104 within the memory tag 100 makes use of the memory controller 106 and accesses the data specified by the key address field 308 in the data packet 300 received from the reader device 200. The device processor 104 therefore reads, in this example, the sequence "ABC" from the write only memory area 110. This step is set forth in function box 402 of FIG. 14. The memory tag 100 has also received, by way of data field 312 in data packet 300, an amount of random data. This random data is combined with the key sequence "ABC" (function box 404). The key sequence and random data may be combined in any suitable fashion. However, in a preferred embodiment, the key sequence data and random data are interleaved.

At this point it is to be mentioned that the random data is provided to the memory tag 100 from the memory reader 200. The reader device functionality 202 is provided with a random number generator. It is necessary to use random data in order to prevent what is termed "the man in the middle attack". This will be described in more detail below.

The combined key sequence and random data is then passed, in the memory tag 100, under control of the device processor 104 to the hash co-processor 116. The hash co-processor performs a hash function, in the preferred embodiment an optimised SHA1 function, on the data passed to it and produces a hash digest (function box 406). The hash digest is then passed under the control of the device processor 104, via the inductive link, to the memory tag reader 200. As already noted, the hash digest is, in the preferred embodiment, a 160 bit SHA1 digest.

Whilst the above operations are being performed in the memory tag 100, the following steps are carried out within the memory tag reader device 200. The following steps are carried out either under the control of the reader device functionality in one embodiment, or under the control of the device processor and memory controller of the memory tag that is utilised in the memory tag reader device 200 as a co-processor. In the latter scenario, the device processor of the memory tag is operated under the control of the reader device functionality, which includes the reader device processor.

Firstly, the key sequence, in this example "ABC", is read from the write only memory area 204 in the memory tag reader 200. This sequence is identified by the key address value which is also provided to the memory tag (function box 408). The memory tag reader device 200 also retains within it a copy of the random data which is forwarded to the memory tag 100 in random data field 312 of data packet 300. This random data is combined, in the same way as in the memory tag 100, with the key sequence that has been read from the write only memory area 204 within the memory tag reader 200 (function box 410). This combination of data is then passed through the hash co-processor 206 within memory tag reader 200, which is identical to that in memory tag 100 and which therefore will provide an identical digest as long as the key stored in the memory tag reader is identical to the key stored in the memory tag 100 (function box 412).

The memory tag reader device 200 and thus the memory tag reader device processor is now in possession of the hash digest produced in the memory tag 100 and the hash digest produced in the memory tag reader 200. These are compared (function box 414, 416) and if they match the memory tag is identified as authentic (function 418). Otherwise, the memory tag is not an authentic tag and may be rejected (function box 420).

As will be appreciated, this process of authentication prevents the copying or cloning of memory tags. The write only memory area of the memory tag cannot be read by a memory tag reader device, such as device 200, and therefore cannot be written into a second memory tag. Therefore, if a memory tag is cloned, upon carrying out the authentication process described above, the hash digest produced in the memory tag will be different to that produced in the memory tag reader, because the key sequence "ABC" will not be present in the memory tag. This will result in the memory tag being identified as not authentic.

This authentication procedure also prevents the man in the middle attack, as mentioned above. The man in the middle attack is as follows. A device placed between a reader and a tag will read the output of a tag when it is queried by a reader device. Thereafter, every time the tag is read, the "man in the middle" device will send to the reader that first output. That is, the man in the middle looks at the hash digest that is produced by the memory tag and sends it to the reader. Thereafter, whenever the tag is read, the man in the middle returns the same hash digest. If deterministic data is combined with the key sequence it is possible to determine what the key stored in the tag is by looking at various digests sent by the tag. This is not possible if random data is used as in the present invention.

In order to make the above process more secure, the global unique identification (GUID) assigned to a memory tag may be read from the ROM area of the tag 100 and combined with the chosen key sequence. This combination may then be passed through a hash co-processor and the digest produced may be stored as the key sequence in the WOM areas in the memory tag and the memory tag reader. Doing this ties the key sequence to the memory tag and therefore gives more security. Again, the combination of the global unique identification and the chosen key sequence may be performed in any way, such as interleaving.

It is also possible to authenticate the data that is stored in the random access memory area 114 of a memory tag 100 memory 102. This procedure requires the use of a further key sequence which is also stored in the write only memory of the memory tag. This is discussed with reference to FIG. 15.

As before, the person or institution issuing memory tags chooses a key sequence, which will be "ABC" again in this example. This is stored as the first key value in the write only memory 110 of a memory tag 100 and also in a write only memory 204 of a memory tag reader 200 as described above. This sequence is only known to the person/institution issuing the memory tags. Other data, which is readable by the memory tag reader device 200, is stored in the random access memory area 114 in the memory tag 100. In the example of museum access, this may be a number of entries that are permitted to the museum, for example 20. The data stored in the random access memory area 114 is also combined with the first key sequence (in any suitable fashion, but preferably by interleaving) and that combination is then passed through a hash co-processor, either in the memory tag 100 or in the memory tag reader 200, when the key sequences are written. This hash digest is then stored as the second key sequence in the write only memory area 110 of memory tag 100 only.

In order to authenticate that the data stored in the random access memory area 114 of the memory tag 100 is correct, and has not, for example, been tampered with by someone wishing to increase their number of allowed accesses, the following steps are carried out.

When the memory tag is brought into close proximity with the memory tag reader at the museum portal the procedure set forth above is carried out in order to permit interaction between the two devices. The reader device 200 then sends to the memory tag 100 a normal read request in order to read from the random access memory area 114 the data that is stored in it. Upon receipt of this read request, which may for example take the form of a data packet such as that shown in FIG. 1b(i), the memory tag device processor 104 activates the memory controller 106 and reads from the random access memory area 114 the data stored therein, in this example the value "20". That data is then passed, via the inductive link, to the memory tag reader 200 (function box 502). It should be appreciated that the data stored in the random access memory (RAM) area 114 of the memory may be accessed and altered by unauthorised personnel, in this example to increase the permitted number of accesses to the museum. Such behaviour will however be detected, as discussed below.

The reader device 200 then sends to the memory tag 100 a data packet including an authenticate command and the address of the second key sequence along with random data. In response to this, the memory tag 100 reads the second key sequence from the specified memory location in the area of WOM 110 (function box 504) and combines the second key sequence with the random data (function box 506). This combination is carried out in any suitable manner, but again interleaving is preferred.

This data sequence is then passed through the hash co-processor which produces a hash digest, in the preferred embodiment an optimised SHA1 digest of 160 bits in length (function box 508). The hash digest is then passed, via the inductive link and under the control of the memory tag device processor 104, to the tag reader device 200.

Meanwhile, in the memory tag reader 200, the key sequence "ABC" stored in the write only memory area 204 within the memory tag reader device 200 is read in the same fashion as described above with regard to FIG. 15 (function box 510). This key sequence is combined with the value read from the random access memory area 114 of the memory tag 100 (function box 512). A hash digest of the combination is generated in the reader device. This hash digest is then combined with the random data that was forwarded to the memory tag, which is also forwarded to the relevant module within the reader device functionality 202 (function box 514).

The final combination of data produced in function box 514 is then passed through the hash co-processor 206 in the memory tag reader 200, which operates as described previously to generate a hash digest (function box 516). This hash digest is compared by the memory tag reader device processor with the hash digest received from the memory tag (function 518).

As will now be apparent, the hash digest produced in the memory tag is produced from the combination of the second key value with random data. The hash digest generated in the reader device 200 is generated from a hash digest (generated from the first key value combined with the data stored in the random access memory area 114 of the memory tag) combined with random data in the same manner as in the memory tag before being hashed. As the second key sequence in the memory tag 100 corresponds to the hash digest of the first key sequence combined with the data stored in the random access memory area 114, if the data stored in the random access memory 114 is tampered with, the hash digest generated in the reader will be different to that generated in the memory tag. Hence, if the digests match (function box 520), the data stored in the random access memory area 114 is authentic (function box 522). However, if the digests do not match, the data stored in the random access memory 114 is not authentic, and has therefore been tampered with or the like (function box 524). Hence, the authenticity of any data stored in the area of general access memory (RAM 114) may be assured.

In the example of museum access, therefore, once the data stored in the random access memory area 114 has been authenticated, the portal can allow access to the museum and the reader device 200 can i) write a decremented value into the random access memory area, and ii) generate a hash digest of the new data combined with the first key sequence and write this to the second key sequence location in the write only memory. One of the permitted entries to the museum is therefore wiped from the memory tag access device. Such a process may be utilised equally in bus/train passes and telephone payment cards for example. It may also be used in payment cards for other services and/or items, for example.

Figure 15:
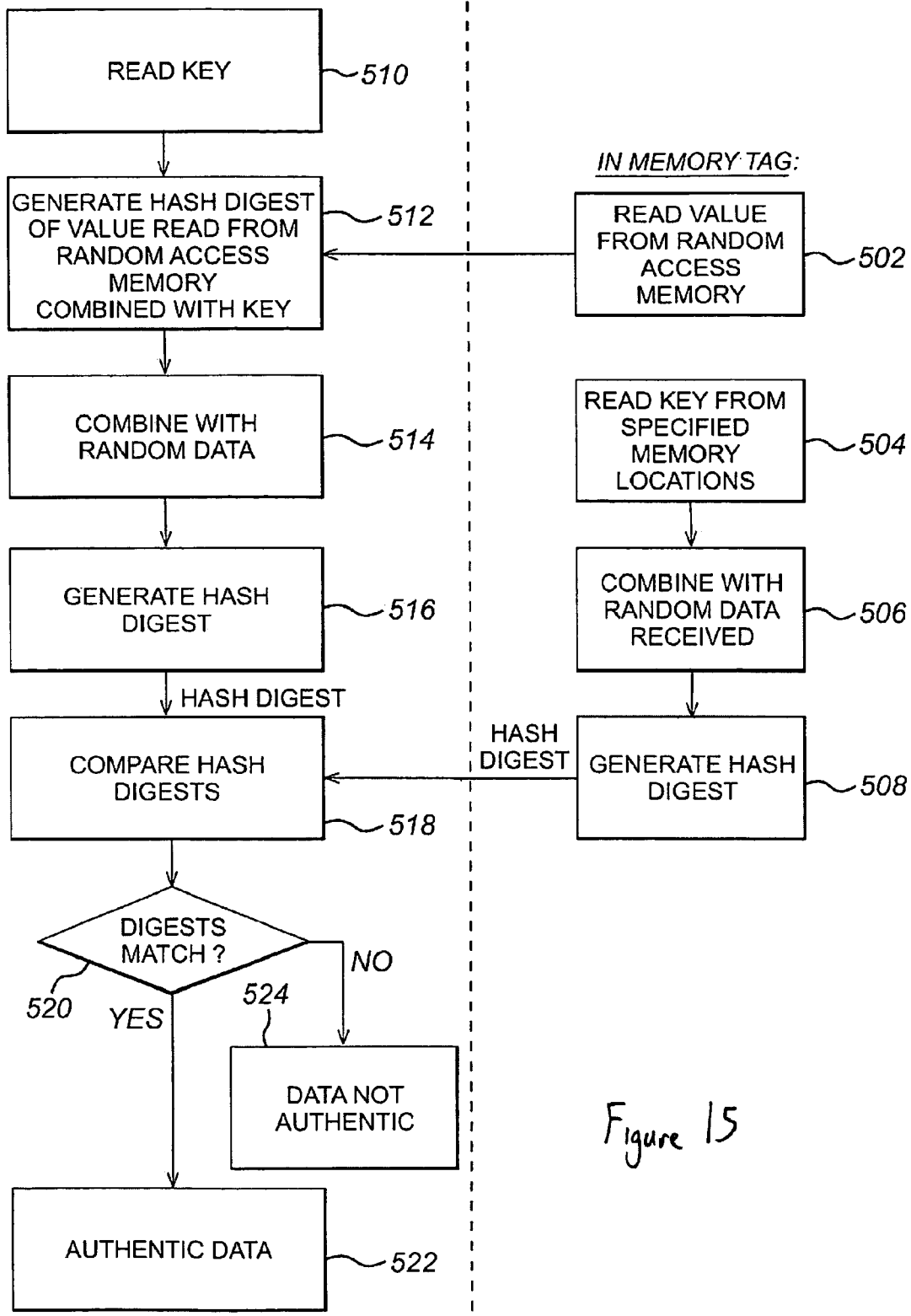
FIG. 15 shows a flow diagram depicting a process of authenticating data stored on a memory tag according to an embodiment of the invention.
Figure 16:
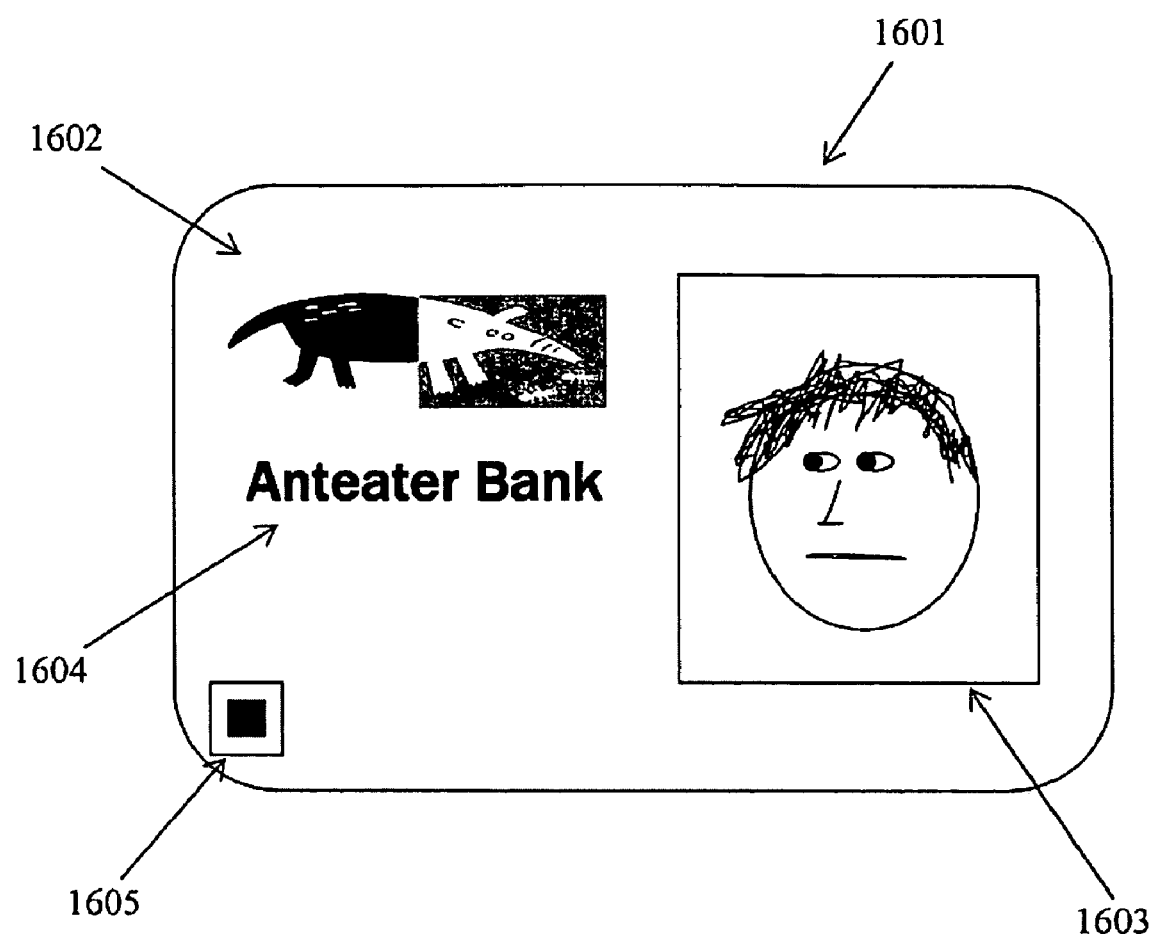
FIG. 16 shows a physical object according to a further embodiment of the invention.

Of course, the process of FIG. 14 and the process of FIG. 15 may be carried out on the same memory tag. Hence, the authenticity of a memory tag may be ascertained utilising a first key sequence and the authenticity of the data stored upon the memory tag may be ascertained utilising the first key sequence, a second key sequence and the data stored in the random access memory area 114. Moreover, more than one key sequence (present in both the memory tag and the reader device areas of WOM) may be combined and then be combined with the random data in either of the above examples, thereby providing greater security.

Using the approaches described above, a security document can be created which comprises a printed document and one or more memory tags. These memory tags are memory circuits adapted to be read wirelessly (preferably, inductively powered also) and are attached to or incorporated within the printed document. Data in the memory circuit is protected from access by an unauthorised reader, either by measures taken in writing the data, or by presence of a unique ID or cryptographic capacity in the memory tag itself. The memory tag is physically isolated so as to inhibit physical tampering (for example, by tamper-resistant techniques of the kind discussed with reference to FIG. 8) or to indicate when physical tampering has occurred (for example, by tamper-evident techniques of the kind discussed with reference to FIG. 7).

Figure 10:
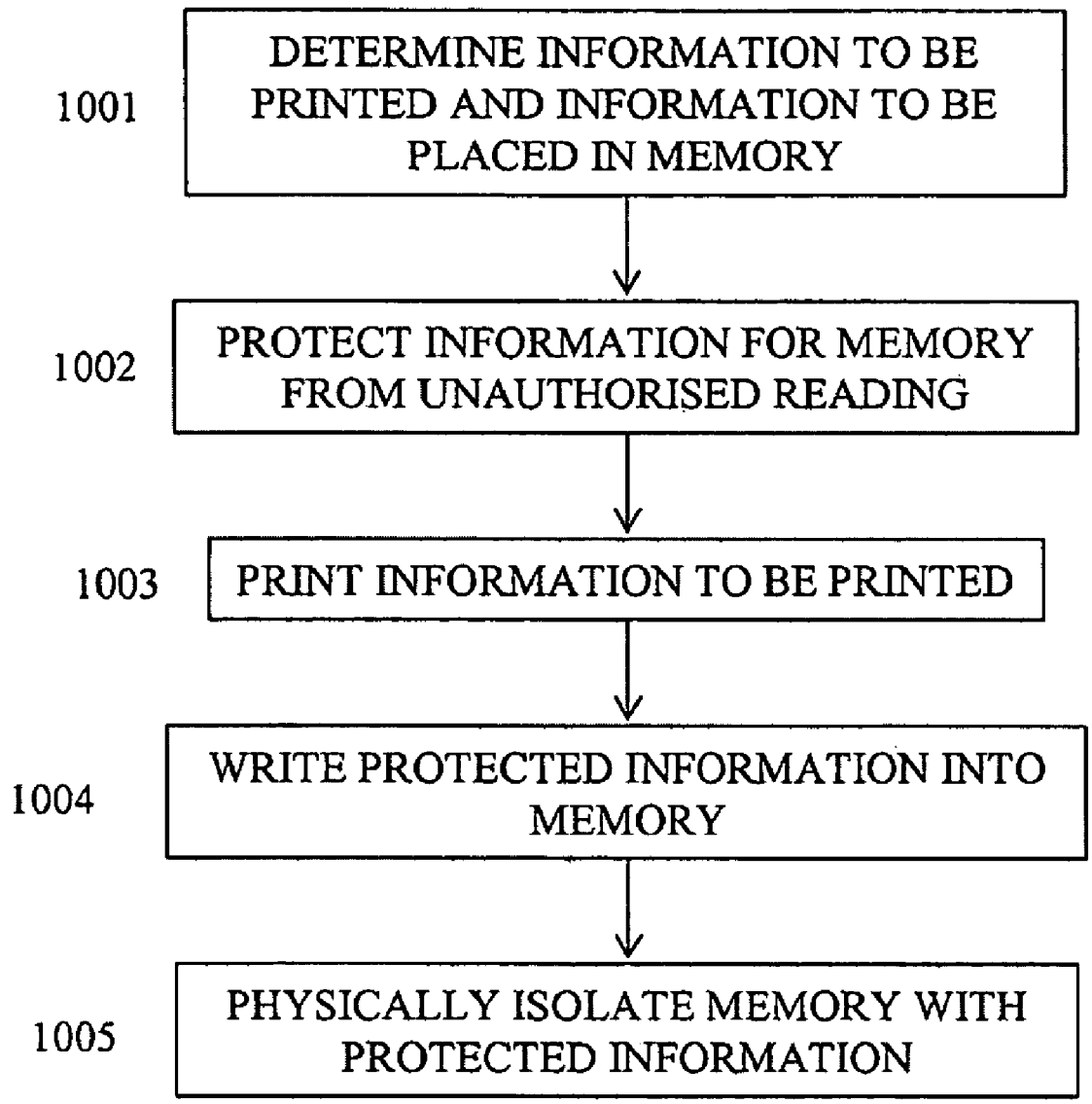
FIG. 10 shows a method of publishing a security document according to an embodiment of the invention.

The steps involved in creation of such a document are illustrated in FIG. 10. A first step 1001 is to determine some information for printing in a printed document, and further information for writing to the memory physically located in the document. Where the document is a bearer document (such as a passport or bank passbook), the printed information may include a photograph, a signature, a name or other biographical or practical details, whereas the stored information may provide similar information but most effectively will contain information which is complementary rather than identical (it may, for example, be particularly useful for bearer image information to be stored only in the memory, so that it is not visually apparent from the document on its own). A next step is to protect 1002 the memory information from unauthorised reading by one of the methods discussed above. After this, the relevant information is printed 1003 to the printed document, and the protected information written 1004 to a memory circuit, with the memory circuit being incorporated 1005 into the document such that it can be read wirelessly but in a physically isolated manner such that physical tampering is inhibited or made detectable.

Figure 11:
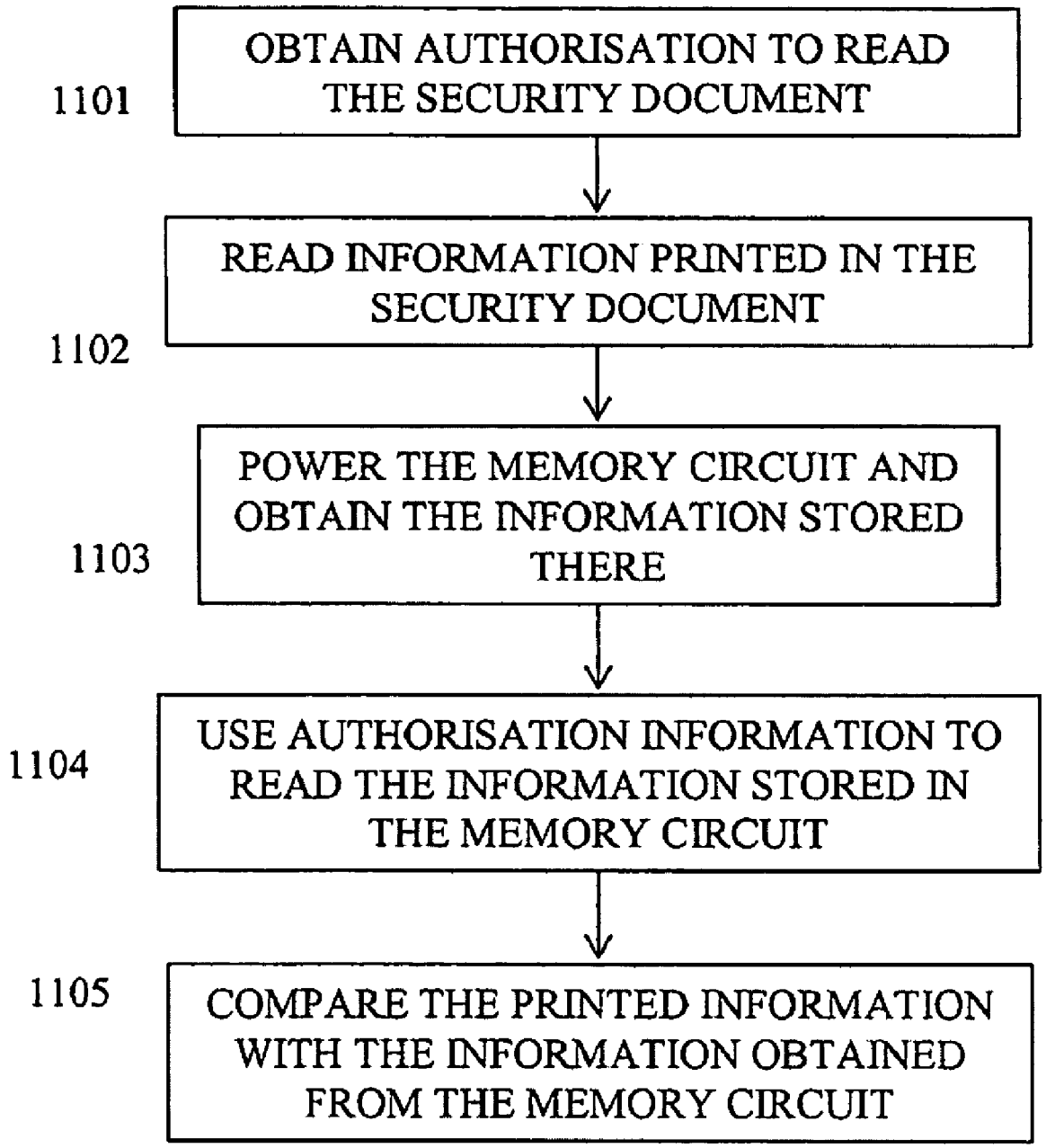
FIG. 11 shows a method of reading a security document according to an embodiment of the invention.

A security document of this type is shown in FIG. 9, which also illustrates how a document of this type would be read, with reference to FIG. 11. A security document 901 contains printed material and a signature strip 902, signed by an authorised bearer. Embedded within the security document 901 is a memory tag 903 embedded in a tamper-resistant region 903. A reader for the memory tag comprises a stylus 910 used in conjunction with a computer or other processing device 911—the processing device has a display 912.

The reader may now, or later, be equipped 1101 with authorisation information enabling it to interpret or obtain information received from the memory tag. While a user views 1102 printed information, the reader accesses 1103 the memory tag 903 to obtain information from it. The physical isolation and protection of the memory tag, together with the security policy employed in writing to or electronically protecting the memory tag, should be sufficient to give adequate confidence to the authorised reader that the memory tag has not been subverted. The information in the memory tag is then downloaded, after whatever security interchange between the memory tag processor (if there is one) and the processor 911 is required, and decrypted or otherwise converted 1104 to usable form by use of the authorisation information, to which processor 911 has access. The results are then displayed on display 912. In this case, what is displayed is the signature matching the signature on the signature strip 902, but also the face of an authorised bearer—the user of the reading device can therefore use 1105 these complementary pieces of information to determine not only whether the security document is valid (by the matching of the signatures) but also whether it is being carried by the correct person—this information not being available to an unauthorised bearer, as the security document itself contains no printed picture.

Such a security document could be used, as in the scenario described above, identify an authorised bearer of the security document. However, it could also be used to allow access to a specified asset or assets by the authorised bearer (such as a bank account). A part of this process could be to update state information (such as a withdrawal log) on the memory tag itself, for a memory tag which contains writable memory.

A further approach to providing a physical item according to embodiments of the invention is discussed with reference to FIG. 16 onwards. In this approach, data hidden by combination with other elements on the physical device is shown to enable an exemplary authentication solution. This uses steganographic techniques—steganography is the discipline of writing hidden messages in such a way that no one apart from the intended recipient knows of the existence of the message; this is in contrast to cryptography, which involves obscuring the content of messages which are known to exist. The example shown uses a combination of steganographic, cryptographic and biometric techniques to provide an effective method of secure authentication without connection to an authorization server.

Figure 17:
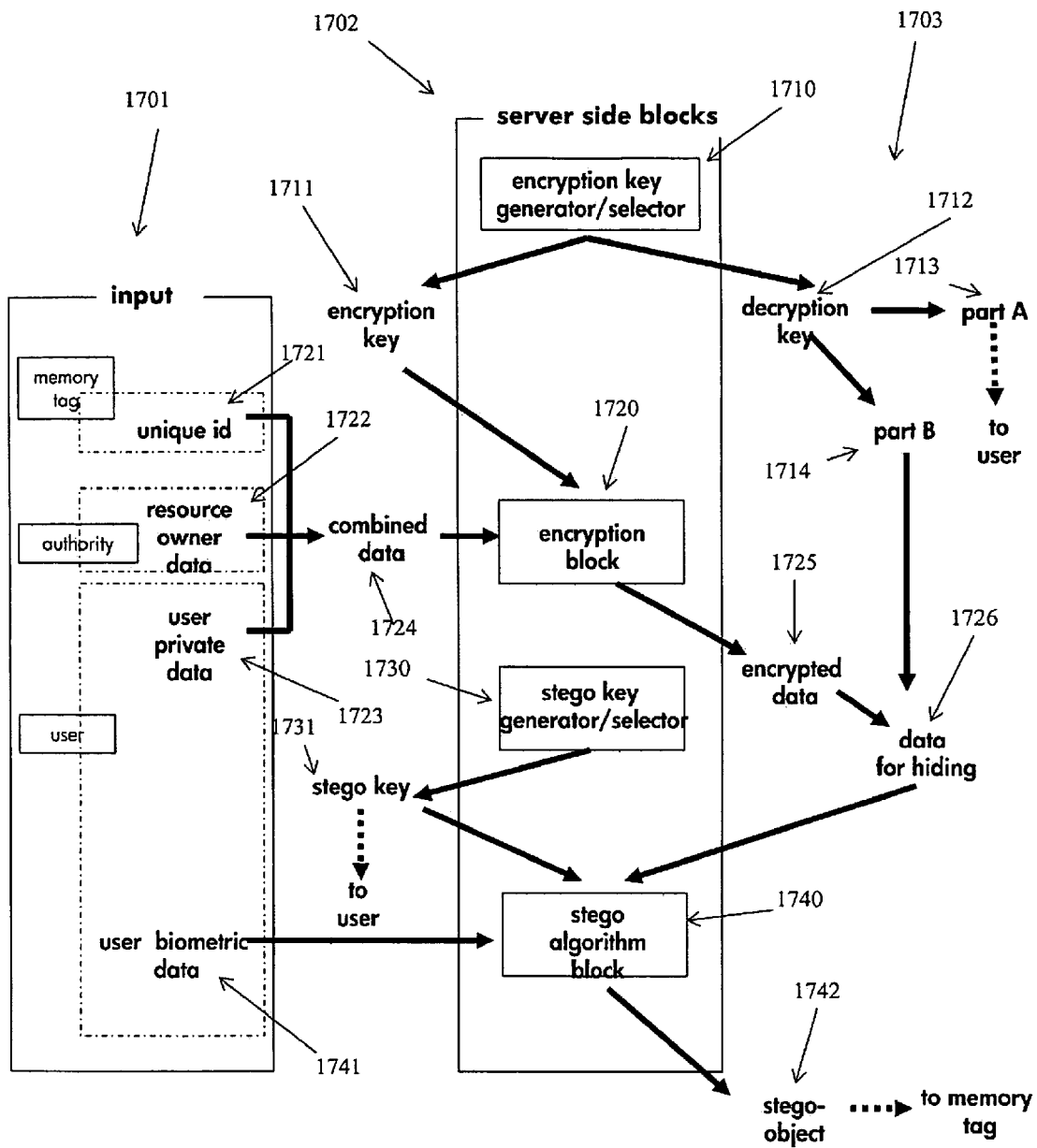
FIG. 17 shows initialisation of a memory tag in a physical object in accordance with a further embodiment of the invention.

FIG. 16 shows an exemplary physical item according to this embodiment of the invention. It is here in the form of a card 1601, with images 1602, 1603 and text 1604, and a memory tag 1605. The memory tag 1605 is adapted to store user biometric data, the biometric data itself containing further data hidden steganographically. A process for creating such a card 1601 will now be described with reference to FIG. 17. It should however be noted that the physical item need not be a card as shown here—it could be any physical object to be held personal to a user (such as a key tag, charm, pen, watch, locket or even a mobile phone).

Creation and initialization of the card 1601 involves use of one or more servers (for example, a suitably configured authorization server 1702). Various inputs 1701 to the process are required, all of which need to be supplied to at least one of the server side blocks required for the creation and initialization process. The system has a number of outputs 1703 to be provided either in the card 1601 (image or memory spot), or to the user associated with the card 1601. The different elements of creation and initialization of the card by server 1702 will be discussed in turn.

Block 1710 involves the generation or selection of encryption and decryption keys. This may be done by standard cryptographic techniques, with number of bits of encryption and mechanism selection (for example, symmetric or asymmetric) chosen on the basis of degree of security required against convenience and processing power available. The encryption key 1711 will be used further by the server 1702. The decryption key is in this arrangement split into two parts, which may be done in any conventional way. A first part 1713 is to be provided by the user, as a user PIN (or as part of a user PIN). A second part 1714 is to be used to form part of the steganographically hidden data, and so provides an input to a later server side block. This ensures that user input is required when the memory tag is read from the subsequently produced card to allow the hidden data to be decrypted.

Block 1720 involves the encryption of data to be held steganographically. This involves three of the inputs 1701. The first of these inputs is a unique memory tag ID 1721. As indicated previously, a unique memory tag ID has the desirable effect of preventing the cloning of a physical item containing a memory tag by simply copying data to a different memory tag. The second of these inputs is data 1722 relating to a resource to be accessed by a user—for example, an indication of user privileges, or time limits for valid authorisation. The third of these inputs is data 1723 private to the user (such as medical or other private data which the user would only wish to release to known other parties). For some purposes, the second input or the third input may not be required. These three inputs are combined together in any appropriate manner to form combined data 1724, which is encrypted by the encryption block 1720 using the encryption key 1711. The encryption key 1711 may be destroyed at this point to prevent replication of the encryption procedure should the key be subsequently found. The encrypted data 1725 resulting is then added to the second part 1714 of the decryption key (further unencrypted data may be added at this point, for example to present an appropriate message to the successful decrypter of the message or to round the data to a uniform size) to form the data 1726 for hiding.

Block 1730 involves the generation or selection of a key (termed a "stego key") for the hiding of data steganographically. This key—which may be any kind of key conventionally used for the purpose—should be disclosed to the relevant user. This key is, preferably, one that can be memorized by the user—though secure storage personal to the user may provide an alternative.

Block 1740 involves the creation of the steganographically hidden data. This requires a further input from the user in the form of user biometric data 1741. This could be effectively any form of biometric data—fingerprint, iris scan, high resolution image, voice sample, even DNA—in digital form. This biometric data is preferably of high quality—not only is this in itself desirable for authentication, but it also provides for additional bits of resolution which can readily be used to hide data. This and the stego key 1731 are provided as inputs to a steganographic algorithm—which, again, may be of any conventional type (examples are discussed in "Information Hiding Techniques for Steganography and Digital Watermarking", edited by S. Katzenbeisser and F. A. P. Petitcolas, Artech House, 2000). The result is "stego-object" 1742, which comprises user biometric data 1741 with the data for hiding 1726 steganographically hidden within. This stego-object 1742 is to be written to the memory of the memory tag of the card 1601.

The stego-object 1742 written to the memory of the memory tag is desirably written into memory which can only be written once but read many times. Such a function may be achieved physically (by burning out one or more switches on the memory tag after writing data) or in software.

Figure 18:
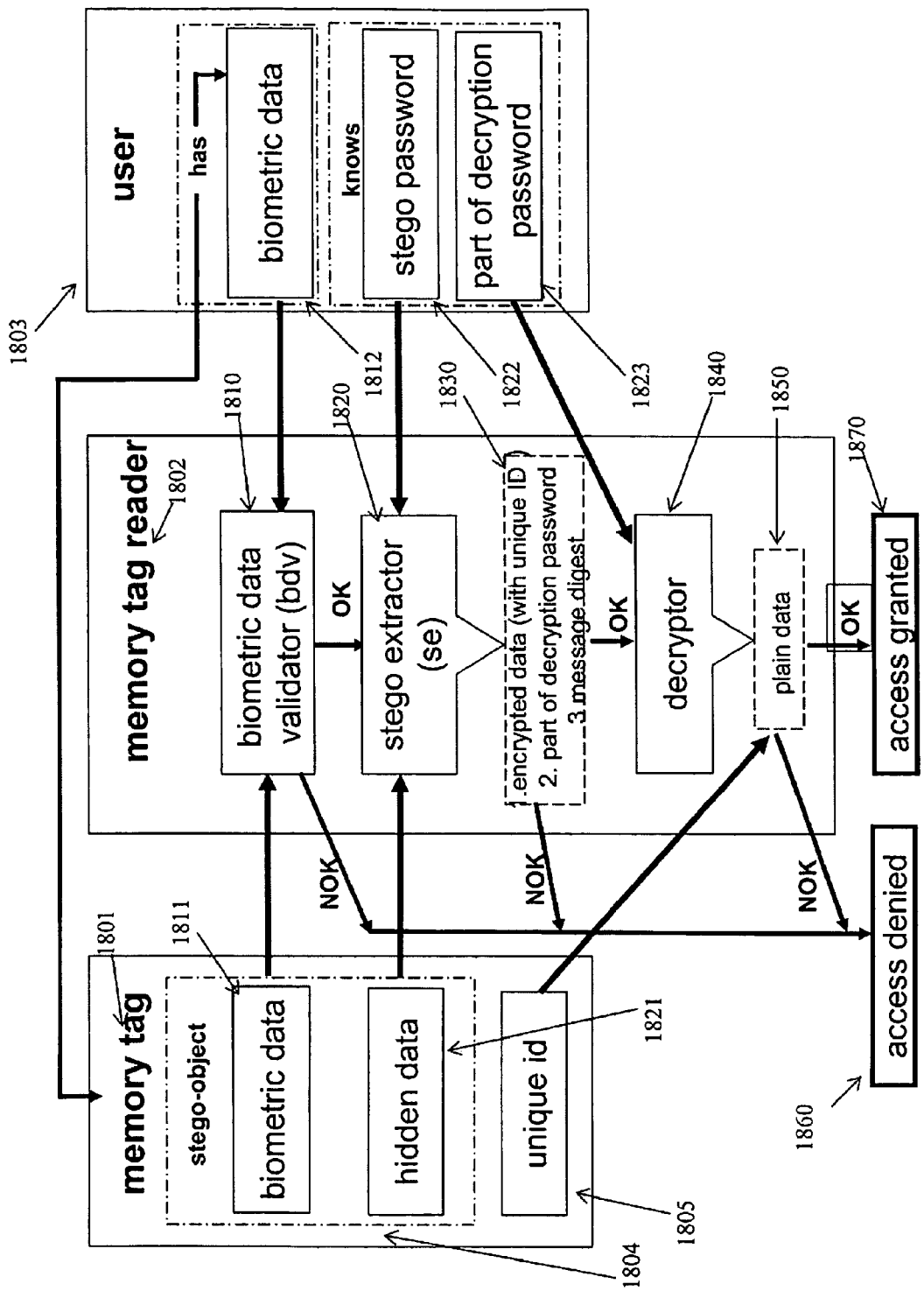
FIG. 18 shows authentication of an authorised bearer of a physical object in accordance with a further embodiment of the invention.

The process of authentication of a user to an appropriate third party is shown in FIG. 18. It can be noted that this authentication process does not rely on the active presence of any authentication server—all such interactions take place only during initialization, rendering this approach to authentication particularly effective where there will not always be a network (or perhaps a trustworthy network) present. It will be shown that the arrangement described will satisfy the basic principles of authentication processes—it establishes who you are, what you have, and what you know.

The three entities interacting in the authentication process shown in FIG. 18 are the memory tag 1801 embedded in the physical item, the memory tag reader 1802 of the third party, and the user 1803 who is associated with the physical item. The memory tag 1801 contains the stego-object 1804, which has within it both biometric data 1811 and the hidden data 1821, and the memory tag unique ID 1805. The memory tag reader 1802 has the relevant software for validation and decryption of data, but has no input data. The other input data not provided at the memory tag 1801 is provided by the user 1803.

The first step 1810 is the extraction of biometric data. This involves the collection of biometric data 1812 from the user 1803 and uploading of the biometric data 1811 from the memory tag 1801. The complexity of this procedure may depend on the degree of security required and the appropriateness of a credential to a particular purpose. For example, an appropriate solution may be for the biometric data 1811 on the memory tag to be an image of the user (for security purposes, it may be desirable for this image not to be identical to any user image printed on to the physical item itself). The "validator" 1810 for this biometric data may simply be a display function at the memory tag reader 1802 to allow the third party controlling the user to compare the image data 1811 stored on the tag with the user's actual appearance 1812. If different biometric data is desired—for example user fingerprints—then the biometric data 1811 stored on the memory tag 1801 may need to be compared with data 1812 measured from the user 1801 with an appropriate measurement function of, or associated with, the memory tag reader 1802 (such as a fingerprint reader) and then compared by an appropriate comparison program within the biometric data validation block 1810. The stored biometric data 1811 should not need to be separated from the hidden data 1821 to be evaluated—while it is the biometric data 1811 that is being in effect compared, any comparison operation performed by the validation block 1810 is in fact carried out on the whole stego-object 1804. It is therefore desirable for the biometric data to be of sufficiently high resolution that the very highest data resolution is not necessary for validation (so this level of resolution can be "corrupted" by hidden data).

If this biometric check fails, the whole process fails 1860—typically this will mean that the user is not allowed access to resources controlled by the third party controlling the memory spot reader 1802. If the biometric check succeeds, the control passes to the next functional, the steganographic extractor (SE) block 1820. This block contains a steganographic algorithm for data extraction (matching the steganographic algorithm used for hiding the hidden data). As indicated previously, any appropriate existing steganographic method may be used for this purpose. It is desirable for the steganographic algorithm to be "non-robust", meaning that it is sensitive to relatively minor changes to the "hiding" data—in this case, the biometric data. This is advantageous as even minor tampering to the biometric data will affect the steganographically hidden data—this can be reinforced by including a digest (for example, a hash such as that produced by one of the SHA algorithms) of the original biometric data in the hidden data. The steganographic algorithm requires an input from the user—this is the stego password 1822 produced before the hiding algorithm was run in the initialization phase and provided to the user at that time. Successful extraction of the hidden data is only possible with this password—if it is not provided, then (depending on the algorithm used) there may be either no data produced at all by running the algorithm, or only garbage data. Assuming successful recovery, the extracted hidden data 1830 will comprise some encrypted data (as discussed below), a partial decryption key and a message digest or other information related to the original biometric data—if the data takes this form, it is possible to move to the next functional block, whereas if it does not, authentication fails 1860.

The final stage 1840 is the decryption of the encrypted data contained in the extracted hidden data 1830. While part of the password for decryption is provided with the hidden data 1830, the other part 1823 is in the possession of the user 1803 and must be supplied by them. The two parts of the decryption key are then combined (in whatever way they were previously separated—this may simply be by having the first half of the bits assigned to the hidden data and the second half assigned to the user, for example) and the full decryption key used to decrypt the encrypted data according to the appropriate encryption algorithm. The resulting plain data may contain information relating to the rights allowed to the user 803 in respect of the resources to which the user is requesting access from the third party controlling the memory tag reader 802—these may include an authorization to use a particular resource, explanatory information from resource owners, access time limits, or user personal information, for example. As a final defence against cloning, the plain data also contains the memory tag unique ID which can be compared directly against the memory tag ID 1805 uploaded from the memory tag 1801. If the unique IDs match, that confirms that the stego object 1804 has not been copied from one memory tag to another in a cloning attack. If the tag IDs match and the data is of an allowable type, access to the desired resource or resources is granted 1870—if this stage fails, access is denied 1860.

This approach allows for effective authentication even without an authorisation server (or network connection). It defends against alteration of the biometric data in that such alteration will compromise the hidden data. It defends against data modification as reinsertion of data requires knowledge of relevant algorithms and encryption keys, and as the memory tag stores (in preferred embodiments) such data in a write-once memory. Memory spot unique ID provides a defence against cloning.

It can thus be seen that the integration of a memory tag into a physical item may be used very effectively to provide authentication solutions, particularly solutions that do not rely on the presence of other networked components such as an authorization server.

The invention claimed is:

1. A physical object, comprising one or more memory circuits attached to or incorporated within the physical object that are wirelessly readable by a reader device, wherein data in the memory circuit is protected from access by an unauthorized reader, wherein data in the memory circuit identifies an authorized bearer of the physical object, and wherein data in the memory circuit allows access to a specified asset or assets by the authorized bearer,
   wherein the memory circuit contains biometric data of the authorized bearer and further authorization data steganographically hidden in the biometric data of the authorized bearer,
   wherein the further authorization data comprises encrypted data and a part of a decryption key for the encrypted data,
   wherein the encrypted data includes information relating to the specified asset or assets and the authorized bearers entitlement to access to it or them, and
   wherein the part of the decryption key is combinable with a bearer provided part of the decryption key to form a decryption key for decryption of the encrypted data.

2. A physical object as claimed in claim 1, wherein the memory circuit is inductively powered.

3. A physical object as claimed in claim 2, wherein the memory circuit receives and transmits data wirelessly at radio frequency.

4. A physical object as claimed in claim 1, wherein the memory circuit is physically isolated so as to inhibit physical tampering or to indicate when physical tampering has occurred.

5. A physical object as claimed in claim 1, wherein the memory circuit comprises a read only memory holding a unique ID for the memory circuit.

6. A physical object as claimed in claim 1, wherein the memory circuit comprises a processor operable to process received data and to generate data to be transmitted to the reader device.

7. A physical object as claimed in claim 6, wherein the memory circuit further comprises an area of write-only memory which may be written to by a suitable memory tag reader device but which may be read only by the processor of the memory circuit.

8. A physical object as claimed in claim 7, wherein the memory circuit further comprises a hash co-processor configured to apply a cryptographically secure hash function to data input to it.

9. A physical object as claimed in claim 1, wherein the encrypted data includes information relating to the specified asset or assets and the authorized bearers entitlement to access to it or them.

10. A physical object as claimed in claim 1, wherein the memory circuit comprises a read only memory holding a unique ID for the memory circuit, and wherein the encrypted data also contains the unique ID for the memory circuit.

11. A method of providing a physical object for an authorized bearer to allow access to a specified asset or assets by the authorized bearer, comprising:
  a. generating an encryption key and a decryption key, and dividing the decryption key into a first part and a second part;
  b. encrypting data relating to the specified asset or assets and a unique ID of a memory circuit to form encrypted data, and combining the encrypted data with the second part of the decryption key to form data for hiding;
  c. generating a steganographic key; and
  d. obtaining biometric data of the authorized bearer, and using the steganographic key and a steganographic algorithm to create a steganographic data object in which the data for hiding is hidden in the biometric data of the authorized bearer; and
  e. writing the steganographic data object into the memory circuit whose unique ID is included in the encrypted data, wherein a decryption key for decrypting the encrypted data is formed by combining the first part of the decryption key which is provided by the bearer with the second part of the decryption key which is included in the data for hiding.

12. A method of authenticating a bearer of a physical object as an authorized bearer entitled to access to a specified asset or assets, comprising:
  a. obtaining biometric data from the bearer and comparing the obtained biometric data with biometric data stored in a memory circuit of the physical object;
  b. if the obtained biometric data matches the stored biometric data, extracting data hidden steganographically in the stored biometric data by use of a steganographic key provided by the bearer;
  c. if the data hidden steganographically has an expected form and comprises encrypted data and a second part of a decryption key, decrypting the encrypted data by use of a decryption key formed by combining the second part of the decryption key and a first part of the decryption key which is provided by the bearer; and
  d. if the decrypted data has an expected form, allowing the bearer access to the specified asset or assets as the authorized bearer of the physical object.

* * * * *